United States Patent
Lind et al.

(12)

(10) Patent No.: US 6,216,063 B1
(45) Date of Patent: Apr. 10, 2001

(54) ON-LINE µ METHOD FOR ROBUST FLUTTER PREDICTION IN EXPANDING A SAFE FLIGHT ENVELOPE FOR AN AIRCRAFT MODEL UNDER FLIGHT TEST

(75) Inventors: Richard C. Lind; Martin J. Brenner, both of Lancaster, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/074,024

(22) Filed: May 6, 1998

(51) Int. Cl.[7] ................................. G05D 3/00; G06G 7/76
(52) U.S. Cl. ............................ 701/3; 701/4; 701/10; 701/14
(58) Field of Search .......................... 701/3, 4, 5, 7, 701/8, 9, 10, 11, 13, 14, 15, 16, 120, 121, 122; 244/194, 118.1, 137.4; 73/147, 178 T

(56) References Cited

U.S. PATENT DOCUMENTS

| | | | |
|---|---|---|---|
| 4,116,056 | 9/1978 | Bulychev | ........................ 73/147 |
| 4,343,447 | 8/1982 | Reed | ........................ 244/137.4 |
| 4,475,385 | 10/1984 | Farmer | ........................ 73/147 |
| 5,615,119 | 3/1997 | Vos | ........................ 701/4 |
| 5,819,188 | 10/1998 | Vos | ........................ 701/4 |

*Primary Examiner*—Jacques H. Louis-Jacques
(74) *Attorney, Agent, or Firm*—John H. Kusmiss

(57) ABSTRACT

A structured singular value ($\mu$) analysis method of computing flutter margins has robust stability of a linear aeroelastic model with uncertainty operators ($\Delta$). Flight data is used to update the uncertainty operators to accurately account for errors in the computed model and the observed range of aircraft dynamics of the aircraft under test caused by time-varying aircraft parameters, nonlinearities, and flight anomalies, such as test nonrepeatability. This $\mu$-based approach computes predict flutter margins that are worst-case with respect to the modeling uncertainty for use in determining when the aircraft is approaching a flutter condition and defining an expanded safe flight envelope for the aircraft that is accepted with more confidence than traditional methods that do not update the analysis algorithm with flight data by introducing $\mu$ as a flutter margin parameter that presents several advantages over tracking damping trends as a measure of a tendency to instability from available flight data.

1 Claim, 11 Drawing Sheets

ON-LINE μ METHOD FOR ROBUST FLUTTER PREDICTION IN EXPANDING A SAFE FLIGHT ENVELOPE FOR AN AIRCRAFT MODEL UNDER FLIGHT TEST

ORIGIN OF INVENTION

The invention disclosed herein was made by employees of the United States Government and may be manufactured and used by or for the Government for governmental purposes without the payment of any royalties thereon or therefor.

FIELD OF THE INVENTION

This invention relates to flight flutter testing, which is the process of expanding the envelope that determines a range of flight conditions within which an aircraft is safe from aeroelastic instabilities. This testing must be done for all new and reconfigured aircraft.

BACKGROUND OF THE INVENTION

Traditional methods of flight flutter testing analyze system parameters, such as damping levels, that vary with flight condition to monitor aircraft stability. (M. W. Kehoe, "A Historical Overview of Flight Flutter Testing," NASA-TM-4720, October 1995.) A real-time method to estimate the damping levels was developed based on a recursive prediction-error method. (R. Walker and N. Gupta, "Real-Time FLutter Analysis," NASA-CR-170412, March 1984.) This method was extended to improve the estimates by considering an extended Kalman filter in the formulation. (R. Roy and R. Walker, "Real-Time Flutter Identification," NASA-CR-3933, October 1985.) On-line methods using both time-domain and frequency domain characteristics of turbulence response data have also been formulated to estimate dampings. (C. L. Ruhlin et al., "Evaluation of Four Subcritical Response for On-Line Prediction of Flutter Onset in Wind Tunnel Tests," *Journal of Aircraft*, Vol. 20, No. 10, October 1983, pp. 835–840.) These methods monitored stability at test points, but they were of limited usefulness for predicting the onset of aeroelastic flutter because damping may be highly nonlinear as flight conditions vary, so damping trends may indicate stability despite proximity to an explosive flutter condition. An alternative eigenspace method was formulated based on orthogonality between eigenvectors, but this method uses a parameter that, similar to damping, indicates stability and may vary non-linearly with flight condition. (D. Afolabi et al., "Flutter Prediction Using an Eigenvector Orientation Approach," *AIAA Journal*, Vol. 36, No. 1, January 1998, pp. 69–74.)

The concept of predicting the onset of flutter by analyzing flight data at subcritical airspeeds has been introduced in conjunction with a method for formulating a flutter margin envelope. (N. H. Zimmerman and J. T. Weissenburger, "Prediction of Flutter Onset Speed Based on Flight Testing at Subcritical Speeds," *Journal of Aircraft*, Vol. 1, No. 4, July–August 1964, pp. 190–202.) This method considered the interaction of two modes in the flutter mechanism to formulate a stability parameter that varied quadratically with dynamic pressure. This technique has been extended to consider several modes interacting as the flutter mechanism in order to demonstrate a prediction method for higher-order flutter. (S. J. Price and B. H. K. Lee, "Development and Analysis of Flight Flutter Prediction Methods," *AIAA Dynamics Specialists Conference* (Dallas, Tex.) AIAA-92-2101, April 1992, pp. 188–200; S. J. Price and B. H. K. Lee, "Evaluation and Extension of the Flutter-Margin Method for Flight Flutter Prediction," *Journal of Aircraft*, Vol. 30, No. 3, May–June 1993, pp. 395–402; and K. E. Kadrnka, "Multimode Instability Prediction Method," *AIAA Structure, Structural Dynamics, and Materials Conference* (Orlando, Fla.), AIAA-85-0737, April 19185, Volume 2, pp. 453–442.) These flutter margin testing techniques have been used for wind tunnel and flight test programs. (R. M. Bennett, "Applications of Zimmerman Flutter-Margin Criterion to a Wind-Tunnel Model," NASA-TM-84545, November 1982 and H. Katz et al., "F-15 Flight Flutter Test Program," *Flutter Testing Techniques*, NASA-SP-415, October 1975, pp. 413–431.) However, the method is of limited applicability for general flight flutter testing because the assumptions of few modes coupling and the requirement to observe those modes may be too restrictive.

Stability parameters were also introduced in determining flutter margins that consider an autoregressive moving average process to describe the aeroelastic dynamics. One parameter was based on determinants from a stability criterion for discrete-time systems that are excited by random turbulence. (Y. Matsuzaki and Y. Ando, "Estimation of Flutter Boundary from Random Responses Due to Turbulence at Subcritical Speeds," *Journal of Aircraft*, Vol. 18, No. 10, October 1981, pp. 862–868 and Y. Matsuzaki and Y. Ando, "Divergence Boundary Prediction from Random Responses; NAS's Method," *Journal of Aircraft*, Vol. 21, No. 6, June 1984, pp. 435–436.) A similar parameter was developed by extending the determinant method to consider short data segments with assumptions of local stationarity. (Y. Matsuzaki and Y. Ando, "Flutter and Divergence Boundary Prediction from Nonstationary Random Responses at Increasing Speeds," *AIAA Structures, Structural Dynamics, and Materials Conference* (Orlando, Fla.), AIAA-85-0691, April 1985, Vol. 2, pp. 313–320.) Another extension to this method derived a similar stability parameter but relaxed the requirements for stationariness. (H. Torii and Y. Matsuzaki, "Flutter Boundary Prediction Based on Nonstationary Data Measurement," *Journal of Aircraft*, Vol. 34, No. 3, May–June 1997, pp. 427–432.) These techniques of determining flutter margins can be applied to complex systems and require only turbulence for excitation; however, the flutter boundary is computed by extrapolating a nonlinear function and may be misleading.

In view of the foregoing, it is clear that in the past the actual flight envelope developed for aircraft operation is essentially determined only by flight testing. The edges of the envelope are points where either the aircraft cannot fly any faster because of engine limitations or, with a 15% margin for error, where the damping trends indicate a flutter instability may be near. After flight testing, the envelope thus empirically determined is used for regular operations. It would be desirable to use both the aircraft model computations and the test flight data in determining flutter margins in order to provide a more expanded and robust flutter margin envelope.

STATEMENT OF THE INVENTION

An object of this invention is to improve flight test efficiency along with maintaining a high level of safety in the process of producing a robust flutter margin envelope for an aircraft model.

A further object is to provide an on-line method of producing a robust flutter margin envelope that is essentially model based so that it not only has the desired predictive nature of a traditional method but also utilizes flight test data to obtain the desired accuracy of predictive estimates. This combines the strengths of both the traditional p-k method and the new method of on-line estimation of the damping method. This new method, referred to hereinafter as a unique $\mu$ method of flight testing for flutter margins is for on-line flight test prediction based upon both analysis data of the aircraft model and flight test data in order that analysis data be updated during the testing procedure for continual correction of the aircraft model data.

What is required is a robust stability approach to formulating a flutter margin envelope that considers a state-space model of the aircraft. This method is based on a formal mathematical concept of using a structured singular value, $\mu$, that guarantees a level of modeling errors to which the aircraft is robustly stable as described in a technical paper by the present inventors R. C. Lind and M. J. Brenner, "Robust Flutter Margin Analysis that Incorporates Flight Data," NASA-TP, March 1998, and presented orally on Sep. 9, 1997, the presentation of which has been documented by a technical memorandum, NASA/TM-97-206220, titled "A Presentation on robust Flutter Margin Analysis and a Flutterometer," both of which by this reference are incorporated herein.

A realistic representation of the modeling errors can be formulated by describing differences between predicted flight and measured flight data. In one application of this invention, the method has been successfully used to compute flutter margins for an F/A-18 Hornet aircraft modified into a Systems Research Aircraft (SRA) at NASA Dryden Flight Research Center. The robust flutter margins were determined form aeroelastic flight data to demonstrate the potential errors that may exist in the flutter margins computed by a traditional p-k analysis. (R. Lind and M. Brenner, "Robust Flutter Margins of an F/A-18 Aircraft from Aeroelastic Flight Data," *Journal of guidance, Control and Dynamics,* Vol. 20, No. 3, May–June 1997, pp. 597–604.)

In accordance with the present invention, on-line estimation of flutter margins are computed during a flight test in contrast to the prior-art flight flutter testing techniques referred to above which actually involve a two-step process that first requires a computational analysis of the aircraft model to estimate off-line flutter margins and then does a flight test of the margins. Although the computational part is often not discussed in conjunction with the actual flight testing part, it is in fact a necessary part.

The basic prior-art procedure that is fairly universal with industry and military organizations around the world consists of two parts:

Part I: Pre-flight estimate of flutter margins
  (1) Generate a computer model that is a 'best-guess' of the aircraft model.
  (2) Compute flutter margins for the aircraft model using a well known p-k method.
  (3) If margins are too small, redesign the aircraft and modify the computer model accordingly. Then repeat steps 1 and 2.
  (4) If margins are OK, flight test the aircraft.

Part II: Flight test to determine envelope
  (1) Take aircraft to test point at flight test condition F, a dynamic pressure defined by, for example, altitude and airspeed.
  (2) Telemeter flight data to ground control room, unless the following step 3 of this Part II can be carried out by computers already mounted in the aircraft.
  (3) Estimate dynamics from flight data such as damping.
  (4) Evaluate levels and trends of dynamics.
  (5) If trends are OK, take aircraft to a flight condition closer to last estimated aeroelastic flutter condition ($F_i = F + \Delta_F$) and repeat steps 2, 3, and 4.
  (6) If trends at any flight test condition are not OK, then declare that condition F as a flutter margin, a point on the edge of the aircraft's safe flight condition envelope.

Note that the information from the computation step (1), Part I, is not used during the flight test, Part II. Conversely, the information from Part II is not used during Part I. This is essentially why the computational Part I is not mentioned when discussing flight testing Part II. Instead, only the computation of margins in Part I are used as a first flutter margin estimate. If the flutter margin computation is good, it is assumed there are no obvious problems with the aircraft, but even if so, a robust flight envelope has still not been determined because the computational results can never be completely trusted. This is so because the model can only be an approximation to the real aircraft and there are often important oddities about the real aircraft resulting in errors that are not anticipated. The estimated flutter margins that are then adopted as the boundaries of the safe operating envelope are only determined by flight testing in Part II without any method of correcting for such unanticipated errors.

Moreover, there is a dramatic risk associated with that flight testing procedure because of the unreliability of looking at damping trends. Damping does not smoothly change as an instability condition is approached; rather, the damping may often undergo sudden changes. Thus, the damping trends may seem good at flight condition F, but there is no guarantee that the damping will not sharply change as the flight condition is changed to $F + \Delta_F$ and aeroelastic flutter of the aircraft may occur. This lack of ability to predict an instability is the reason for the risk in flight flutter testing in this tradition procedure. This results in a greater time and cost in flight testing because the envelope of safe operating conditions must be expanded more cautiously using very small increments of $\Delta F$.

In contrast, the present invention comprises a method used with a singular value, $\mu$, to predict fight margins from flight data at successively higher dynamic pressure conditions of flight at which an onset of a flutter condition will occur. Thus, for given dynamic pressures, such as a given altitude and successively greater airspeeds, the point at which aeroelastic flutter will occur is predicted, and the process is repeated for the full range of dynamic pressures at which the aircraft is capable of safely operating, such as altitudes and airspeeds. Ideally, each flutter margin predicted at a given altitude will be the same. To expand a full operating envelope, the procedure is repeated at all altitudes at which the aircraft is capable of operating. In the $\mu$ method of this invention, the flight data is not used to estimate model parameters or to identify a transfer function; rather, the flight data is only used to update the uncertainty description for the theoretical model of the aircraft being tested. This approach avoids several difficulties in trying to estimate a high-order model from flight data that has low signal-to-noise ratio but still accounts for time-varying dynamics by updating the uncertainty description to describe changing errors between the aircraft and the nominal model.

The stability parameter, $\mu$, that is central to this new flutter margin method is essentially linear with changes in flight condition. Consequently, instabilities can be accurately predicted. In addition, this method can easily consider realistically high-order models and does not make assumptions about the number or type of modes that interact as the flutter mechanism. The process used in a flight flutter test is as follows:

Part I: Pre-flight estimate of flutter margins
  (1) Generate a computer model that is 'best-guess' of the aircraft model.

(2) Computer flutter margins for aircraft model using the well known p-k method (optional).

(3) Compute robust flutter margins for aircraft model using the singular value $\mu$ method.

(4) If the flight envelope determined by computed flight margins is too small under either computation method, redesign aircraft and repeat steps 1, 2 and 3.

(5) If the flight envelope thus computed is OK, flight test aircraft.

Note that step 3 is what distinguishes over the prior art.

Part II: Flight test to determine actual safe aircraft flight envelope (1) Take aircraft to a safe test point at flight test condition F, a dynamic pressure defined by, for example, altitude and airspeed.

(2) Telemeter flight data to ground control room, unless the following step 3 of this Part II can be carried out by computers already mounted on the aircraft.

(3) Compute a predicted flutter point $F_p$ at a higher dynamic pressure using a flutterometer algorithm based on both flight data and singular value $\mu$.

(4) If the difference between the present flight test condition $F_i$ and the predicted flutter point $F_p$ is large, then expand the next flight text condition to $F=F_i+\Delta_F$ and repeat steps 1, 2 and 3.

(5) If the difference is small, then declare the last predicted flutter margin $F_p$ as a point on the edge of the envelope.

The algorithm is repeated for all altitudes at which the aircraft is capable of operating until a completed and robust envelope is developed.

The main advantage to using this $\mu$ algorithm over traditional methods is that with each iteration at a new flight condition F, a new predicted flutter point is determined, whereas in the prior-art damping algorithms that is not the case. Moreover, the envelope can be expanded more confidently and in greater increments of $\Delta F$ because there is not so much concern about sudden changes in damping and stability. The basic flowchart for the flutterometer algorithm is as follows:

1. Read flight dada D from test point at flight condition F.
2. Generate computer model P of aircraft at F.
3. Generate $\Delta$ to relate P and D.
4. Compute analysis of (P,$\Delta$) using the $\mu$ method.
5. Compute prediction of flutter margin from $\mu$, a structured singular value from step 2.

A key point is that the flutterometer algorithm works by using both the computed model data and the flight data. This is important because using only one set of data is insufficient. The model is only an approximation, so it cannot be trusted completely, and the flight data only indicates the current state of the aircraft so it cannot be used alone to predict the flutter margins. Using both provides robust flutter margin prediction which is most important because it enables the safe flight condition envelope to be reliably established without the aircraft actually reaching or even closely approaching a flutter point. Reliable prediction throughout the entire process of developing the flight envelope is due to the fact that the flutterometer algorithm uses flight data to continuously update the structured singular value $\mu$.

Another key point is that time-varying changes in the aircraft dynamics that give rise to modulating errors are taken into account. For example, the weight of a fighter plane undergoes significant changes as fuel is consumed during the flight tests, but the flutter margins are updated correspondingly. This updating is essentially related to the manner in which flight and model data are combined in generating an operator $\Delta$ that describes changes in the model. This is so because the structured singular value $\mu$ is a function of the plant or system P (i.e., aircraft) and is defined by the following:

$$\mu(P) = \frac{1}{\min \overline{\alpha}(\Delta): \Delta \in \Delta, \det (1-P\Delta)=0}$$

where: $\mu(P)=0$ if no $\Delta$ exists such that $\det(I-P\Delta)=0$, and $\Delta$=a structured uncertainty operator (modeling errors and perturbations) which is allowed to lie within a norm-bounded set such that $$\Delta=\{\Delta:\|\Delta\|_\infty \leq 1\}, \text{ and}$$

is a set of perturbations such that the size of the perturbations $\|\Delta\|_\infty$ is $\leq 1$. This means that for robust stability of the plant, no perturbation $\Delta$ greater than size $\|\Delta\|_\infty \leq 1$ can destabilize the plant. Thus, the increase of $\mu$ is the smallest destabilizing perturbation, i.e., an exact measure of stability.

An algorithm is provided for updating the aircraft model using the uncertainty operator $\Delta$ during flight testing under different conditions, and a procedure that uses the structured singular value $\mu$ to determine if the aircraft system P with its set of uncertainty matrix operators $\Delta$ is not invalidated. If so, the set is adjusted until it is not for robust stability of the system. This model validation is then used to generate reasonable norm bounds for a sufficient set of uncertainty operators scaled such that $\mu$ is always less than unity.

Two separate algorithms, local and global, are provided for using flight data sets to update uncertainty operators associated with the aircraft plant model P. In the local algorithm, flight data at identical flight conditions is used. This is done by independently computing uncertainty descriptions, i.e., sets of operators $\Delta$ for models at different flight conditions, resulting in smaller uncertainty operators required for subsonic plants and a less conservative worst-case flutter margin. In contrast, the global algorithm uses the entire set of flight data at all flight conditions to generate a single uncertainty description, i.e., set of operators $\Delta$ for all normal aircraft models. A disadvantage is possibly more conservative flutter margins, but an advantage is that the uncertainty description used for computing a flutter margin (estimate of distance to a flutter point) is truly a worst case.

Although this statement of the invention speaks of developing the flight envelope for new or reconfigured aircraft by testing at elevations with progressively increasing airspeed (to progressively increase dynamic pressure) in search for robust flutter margins (distance to a flight envelope on a graph of altitude versus airspeed), it should be understood that it is possible to hold true airspeed constant for each flutter margin prediction while progressively increasing dynamic pressure by changing altitude or Mach number which is a function of air density that depends on altitude and air temperature. Consequently, while holding a lower true airspeed constant, the computed flutter margin may predict a point below sea level. That is a valid prediction, but the predicted point is outside the flight envelope to be promulgated as the universe of safe operating conditions with a conventional 15% margin for error at lower altitudes.

While the $\mu$ method of computing robust flutter margins has been developed for promulgating an envelope of safe operating conditions, it should be noted that in aircraft having greater computer data processing capability the $\mu$ method can be used with a display as a cockpit flutterometer to provide the pilot with virtually real-time information about changes in flutter margin in terms of altitude, airspeed and dynamic pressure to indicate how far the aircraft can drop before reaching a predicted flutter condition as well as damping trend to indicate when the flutter condition is near.

DETAILED DESCRIPTION OF THE INVENTION

1. INTRODUCTION

Figure 1:
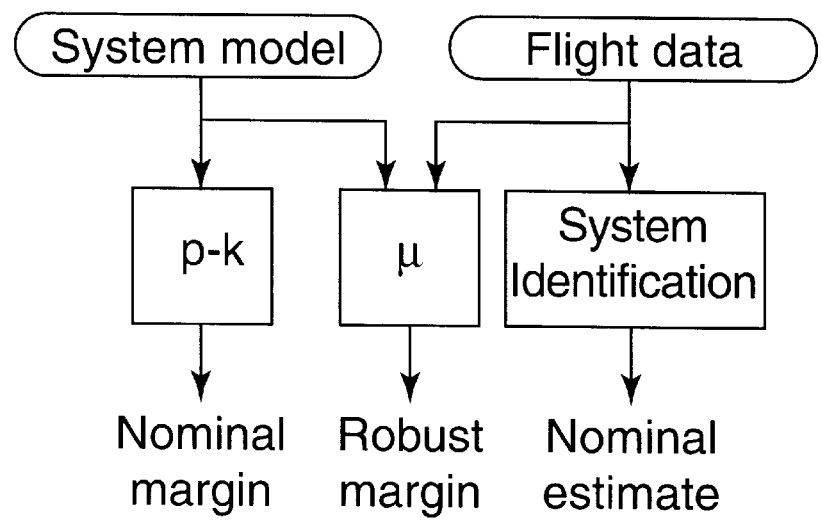
FIG. 1 illustrates diagramatically an information flowchart for traditional and $\mu$ methods to compute flutter margins.

Aeroelastic flutter is a potentially destructive instability resulting from an interaction between aerodynamic, inertial, and structural forces. The stability properties of the aeroelastic dynamics must be investigated to determine a flight envelope that is clear of flutter instabilities for new aircraft designs or new configurations of current aircraft. Analytical predictions of the onset of flutter must be accurate to reduce dangers and costs associated with experimental estimation.

Critical flutter conditions are the points closest to the flight envelope at which flutter instabilities occur. This concept of closeness is formally defined here as a flutter pressure that considers the critical dynamic pressure for a constant Mach value. Obviously, different flutter measures such as a flutter speed can be defined because a unique equivalent airspeed is associated with each dynamic pressure for a given Mach number; however, the following definition 1.O. 1 for a flutter pressure will be used to describe the critical flutter flight conditions.

Definition 1.0.1

A flutter pressure in the smallest value of dynamic pressure for which an aircraft at a particular Mach number experiences a flutter instability.

The flutter pressure is used to compute a stability margin, or flutter margin, that indicates the distance between the flutter pressure and a reference point. A common flutter margin, $\Gamma$, considers the difference in dynamic pressure between the flutter pressure and a point on the edge of the flight envelope. Another common flutter margin, $\pi$, considers the percentage difference between equivalent airspeeds at the flutter condition and a point within the flight envelope.

Definition 1.0.2

Aflutter margin relates a measure of distance between the flight condition associated with the flutter pressure and a reference point.

The traditional p-k method has been extensively used to compute flutter margins for a variety of military and commercial aircraft. (H. J. Hassig, "An Appropriate True Damping Solution of the Flutter Equation by Determinant Iteration," *AIAA Journal of Aircraft*, Vol. 8, No. 11, November 1971, pp. 885–889.) This iterative method uses an analytical dynamic model coupled with harmonic motion solutions for the unsteady aerodynamic forces. The p-k method predicts flutter margins entirely from a theoretical model that may not accurately describe the true dynamics of the airplane. The resulting flutter margins do not account for possible variations between the model and the aircraft.

The community studying aeroelasticity has identified the development of improved methods for characterizing flutter margins as a vital research area. Flight testing for envelope expansion incurs dramatic time and cost because stability margins are not computed with a high level of confidence using traditional methods. The flutter dynamics often exhibit an explosive behavior that results in a sudden change in stability for a small change in flight conditions. Thus, small errors in predicted margins could have grave consequences for aircraft and crews operating near the flutter conditions.

Several approaches exist for characterizing accurate flutter margins using flight data generated by the aircraft. These data describe the true dynamics and can be used to generate realistic models and compute confident flutter margins. Parameter estimation algorithms have been developed to directly identify an aeroelastic model from the flight data. The accuracy of the resulting model can deteriorate as the complexity and number of degrees of freedom of the system increase and signal-to-noise ratios decrease from optimal wind-tunnel conditions to realistic flight levels. Modal filtering has been introduced in association with parameter estimation algorithms to simplify analysis by decoupling the system into a set of first-order responses. This type of filtering does not guarantee robustness and may not perform well for systems with many closely-spaced modal natural frequencies that cross and shift as flight conditions change.

Other approaches toward computing confident flutter margins evaluate the robustness of a stability margin with respect to changes in the model as an indication of the confidence in that margin. A flutter margin robust to perturbations to the model is a confident margin because model inaccuracies do not affect that margin. An algorithm has been developed to compute the most critical flutter margin with respect to first-order perturbations in a model. This method considers only parametric perturbations and can be computationally expensive. A robust control framework has been adopted using a feedback structure to relate the structural model and the aerodynamic model. This approach uses highly conservative robustness conditions with respect to an uncertainty structure that may not be physically meaningful. A similar approach is adopted allowing unmodeled dynamics and high-order parametric perturbations based on series expansion. Statistical approaches are also considered to formulate a flutter probability measure. These approaches will converge to a robustness indicating using Monte Carlo simulations, but the computation time can be prohibitive for complex systems. The robustness measures for these perturbation and statistical approaches are suspect because no global guarantees can be made as to perturbations not explicitly considered by the minimization algorithms or the Monte Carlo simulations.

An approach to computing flutter margins that guarantees a level of robustness and directly accounts for flight data is presented herein. (R. Lind and M. Brenner, "Robust Flutter Margins of an F/A-18 Aircraft from Aeroelastic Flight Data," *AIAA Journal of Guidance, Control and Dynamics*, Vol. 20, No. 3, May–June 1997, pp. 597–604.) An aeroelastic model is formulated in a formal robust stability framework that uses a set of norm-bounded operators, $\Delta$, to describe modeling errors and uncertainty. A multivariable robust stability measure known as the structured singular value, $\mu$, computes flutter pressure that are robust to the amount of modeling errors as determined by $\Delta$. (G. J. Bales et al., *μ-Analysis and Synthesis Toolbox*, Musyn Inc. and The MathWorks Inc., Minneapolis, Minn. and Natick, Mass., 1995.) A robust flutter margin problem is posed by questioning what is the largest increase in dynamic pressure for which the plant is stable despite possible modeling errors described by $\Delta$.

Flight data are easily incorporated into the analysis procedure. The modeling errors are determined by comparing transfer functions obtained by flight data with transfer functions predicted by the analytical model. The norm bound on $\Delta$ is chosen based on these observed errors. A model validation condition is used to ensure the $\Delta$ is sufficient to account for multiple data sets without being excessively conservative. With respect to $\Delta$, a worst-case flutter boundary is computed that directly accounts for flight data.

This method illustrated diagrammatically in FIG. 1 is inherently different from traditional algorithms based on p-k methods or parameter identification and robustness approaches. The $\mu$ method uses information from both an analytical system model and flight data; traditional approaches use only one of these sources, namely the system model in the p-k method. Methods that use only an analytical model can be inaccurate, and methods that use only the flight data can fail if the data are of poor quality. The $\mu$ method uses the flight data to improve the analytical model by adding uncertainty operators. Poor quality flight data will merely increase the difficulty of obtaining a reasonable uncertainty description resulting in a small $\Delta$. The robust margins will be similar to the nominal margins in this case, which makes intuitive sense because any information obtained from the data should only enhance the plant model and improve the accuracy of the flutter margin.

The concept of computing robustness in flutter margins has been recognized for its importance and has recently been termed a state-of-the-art research area in aeroelasticity. Informal measures of robustness are not necessarily useful because the informal measures provide no guarantee for the system stability. The $\mu$ method is based on operator theory and provides a well-defined concept of robustness that has a clear set of guarantees as to the stability properties of the system.

ROBUST STABILITY

A common definition of a signal is a Lebsegue measurable function that maps the space of real numbers R into $R^n$. A space of such signals is denoted $S$.

Definition 2.1.1

The space of signals that are Lebesgue measurable functions is S.

$$s=\{f:R\to R^n\} \qquad (1)$$

Analog measurements x(t) of physical systems are real vector functions of the real parameter t describing time and thus are valid members of the space of signals, $x(t) \in S$. Values of the time parameter, which are often arbitrarily numbered as a distance from some reference point, actually extend to positive and negative infinity. Stability for physical systems must ensure stability for all values of time. A time-domain 2-norm is defined as a measure of size (or energy) for time-domain singlas $x(t) \in S$ that considers all time.

Definition 2.1.2

The 2-norm measures the energy of a signal $x(t) \in S$.

$$\|X(t)\|_2 = \left(\int_{-\infty}^{\infty} |x(t)|^2 \, dt\right)^{1/2} \qquad (2)$$

One characteristic of a stable system is that only finite-energy output signals are generated in response to finite-energy input signals. Signals with finite energy are known as "square integrable" because the integral of the square of the signal is finite. The Lebsegue space of square integrable signals is defined as $\mathcal{L}_2(-\infty\infty)$. This space is also referred to as the infinite-horizon Lebesgue 2-space to denote that the norm uses an integral over infinite time.

Definition 2.1.3

The space $\mathcal{L}_2(-\infty,\infty)$ consists of square integrable time-domain signals.

$$\mathcal{L}_2(-\infty,\infty)=\{x(t):x\epsilon s,\|x(t)\|_2<\infty\} \quad (3)$$

Signals associated with physical systems are only known for values of time greater than the time at which measurements are started. Stability analysis and norm computations using these signals cannot use properties of the signal before the starting time because no information is known. The traditional method of characterizing these signals is to assume the signal is identically zero for all times before the starting time. The time value at which measurements are started can be chosen without loss of generality and is usually chosen to be t=0. The space $\mathcal{L}_2(0,\infty)$ is defined as a subset of the infinite-horizon Lebesque 2-space to emphasize such signals. They are identically zero for all t<0.

Definition 2.1.4

The space $\mathcal{L}_2[0,\infty)\subset\mathcal{L}_2(-\infty,\infty)$ consists of square integrable time-domain signals that are identically zero for all t<0.

$$\mathcal{L}_2[0,\infty)=\left\{x(t):\int_0^\infty\|x(t)\|^2\,dt<\infty, x(t)=0 \text{ for all } t<0\right\} \quad (4)$$

A similar space $\mathcal{L}_2(-\infty,0)$ is defined for signals x(t) that are assumed to begin at t=−∞ and are identically zero for all times t=0. Thus, the integral to compute the energy for elements of this space considers t=−∞ until t>0.

Frequency-domain signals are often considered in stability analysis but do not fall into the set of signals, S. These signals $f(j\omega)$ are complex-valued functions of the imaginary unit $j=\sqrt{-1}$, and the real frequency variable ω is expressed in rad/sec. The set, $S_{j\omega}$ is defined for frequency-domain signals.

Definition 2.1.5

The space of frequency domain signals is $S_{j\omega}$.

$$s_{j\omega}=\{f(j\omega):jR\rightarrow C^n \text{ and } f^*(j\omega)=f^1(-j\omega)\} \quad (5)$$

A frequency-domain 2-norm is formulated to compute a measure of energy.

Definition 2.1.6

The 2-norm measures the energy of the signal $f(j\omega)\epsilon S_{j\omega}$.

$$\|f\|_2 = \left(\frac{1}{2\pi}\int_{-\infty}^\infty f^*(j\omega)f(j\omega)d\omega\right)^{1/2} \quad (6)$$

A frequency-domain Lebesgue space,$\mathcal{L}_2$, is defined for finite-energy signals.

Definition 2.1.7

The space $\mathcal{L}_2$ consists of frequency-domain signals with finite energy.

$$\mathcal{L}_2=\{f(j\omega):f\epsilon s_{j\omega},\|f\|_2<\infty\} \quad (7)$$

The spaces $\mathcal{L}_2(-\infty,\infty)$ and $\mathcal{L}_2$ are isomorphic Hilbert spaces under the appropriate inner produce through the Fourier transform, which means the spaces have equivalent algebraic properties. TN relationship is used to simplify notation by rarely distinguishing between time-domain and frequency domain signals except where the context does not make it clear. The notations for the 2-norm of domain and frequency domain are also not distinguished because the notations are equivalent, as demonstrated by Parseval's identity.

An important subspace of $\mathcal{L}_2$ is the Hardy space, $\mathcal{H}_2$. This space contains the complex variable tions that are analytic in the open right-half of the complex plane and have finite 2-norm.

Definition 2.1.8: The Hardy space, $\mathcal{H}_2\mathcal{L}_2$, consists of the following functions.

$$\mathcal{H}_2=\{f(s):f(s)\epsilon\mathcal{L}_2 \text{ and } f(s) \text{ is analytic in } Re(s)>0\} \quad (8)$$

System Plant

A system P is defined as an operator mapping the space of input signals $S_{in}$ to the space of output signals $S_{out}$. This definition implies that for any $w\epsilon S_{in}$ and z=Pw, then $z\epsilon S_{out}$, $$P:S_{in}\rightarrow S_{out} \quad (9)$$

Linear, time-invariant systems defined by state-space equations are considered.

$$\begin{bmatrix} x(t) \\ y(t) \end{bmatrix} = \begin{bmatrix} A_P & B_P \\ C_P & D_P \end{bmatrix}\begin{bmatrix} x(t) \\ u(t) \end{bmatrix} \quad (10)$$

The signal $x(t)\epsilon R^{n_s}$ is the state vector, $u(t) \epsilon R^{n_i}$ is the input vector, and $y(t) \epsilon R^{n_o}$ is the output vector. The state update matrix is $A_P \epsilon R^{n_s \times n_s}$; $B_P \epsilon R^{n_s \times n_i}$ determines how the input affects the states; $C_P \epsilon R^{n_o \times n_s}$ computes the outputs as a linear combination of states; and $D_P \epsilon R^{n_o \times n_i}$ is the direct feedthrough from inputs to outputs. The operator $S=\{A_P, B_P, C_P, D_P\}$ denotes the time-domain state system.

Linear time-invariant state-space system are commonly represented by transfer-function operators. These function, P(s), are complex-valued matrices of the complex Laplace transform variable, s. Such a transfer-function matrix exists if and only if the state-space system is linear and time-invariant.

$$P(s)=D_P+C_P(sI_{n_s}-A_P)^{-1}B_P \quad (11)$$

Stability must be considered over the infinite-horizon time lengths so that the operators used map $\mathcal{L}_2$ (-∞,∞) into $\mathcal{L}_2$ (-∞,∞) Properties of the Fourier transform relating $\mathcal{L}_2$ (∞,∞) and $\mathcal{L}_2$ simply a state-space system, S: $\mathcal{L}_2$ (-∞,∞)→$\mathcal{L}_2$ (-∞x,∞), is linear and time-invariant if and only if the associated transfer-function matrix P is such that $y=Pu\epsilon\mathcal{L}_2$. This condition leads to consideration of the gain for these signals.

$$\frac{\|y\|_2}{\|u\|_2} = \frac{\|Pu\|_2}{\|u\|_2} \quad (12)$$

This ration of 2-norms will be finite if the system is stable. Properties of the 2-norm are used to derive a condition on the system transfer-function operator, P. This condition is referred to as an induced norm because it results from consideration of signal norms associated with the operator. The $\mathcal{L}_2$ induced norm is defined as the $\mathcal{H}$ ∞-norm.

Definition 2.2.1: Define the $\mathcal{H}_\infty$-norm for transfer-function operators.

$$\|P\|_\infty=\sup\bar{\sigma}(P(j\omega)) \quad (13)$$

A space of operators with finite $\mathcal{H}_\infty$-norm is denoted as $\mathcal{L}_\infty$.
Definition 2.2.2: The space $\mathcal{L}_\infty$ consists of system with finite $\mathcal{H}_\infty$-norm.

$$\mathcal{L}_\infty \overset{\Delta}{=} \{P: \|P\|_\infty < \infty\} \tag{14}$$

Transfer functions of linear time-invariant systems are stable if and only if $z=Pw$ and $w \in \mathcal{H}_2$ implies $z \in \mathcal{H}_2$. This implication results from the Laplace isomorphism between $\mathcal{L}_2[0,\infty)$ and $\mathcal{H}_2$ space. These transfer functions are shown to be analytic in the open right-half complex plane with finite $\mathcal{H}_\infty$-norm. Define the space $\mathcal{H}_\infty$ to contain these operators.
Definition 2.2.3: The space $\mathcal{H}_\infty$ consists of transfer functions of stable, linear, time-invariant system with finite $\mathcal{H}_\infty$-norm.

$$\mathcal{H}_\infty = \{P: P \text{ is analytic in } Re(s0>0 \text{ and } \|P\|_\infty < \infty\} \tag{15}$$

A subspace $\mathcal{RH}_\infty$ is often defined for rational elements.
Definition 2.2.4: The space, $\mathcal{RH}_\infty$, $\subset \mathcal{H}_\infty$ consists of rational elements of $\mathcal{H}_\infty$.

$$\mathcal{RH}_\infty = \{P: P \in \mathcal{H}_\infty \text{ and } P \text{ is rational}\} \tag{16}$$

Transfer-function operators of linear, time-invariant state-space systems are rational functions of the Laplace transform variable, s. These transfer functions $P \in \mathcal{RH}_\infty$ if and only if P is stable such that no poles lie in the closed right-half plane. The space $\mathcal{RH}_\infty$ which may appear to be mathematical abstraction, is thus shown to have a physical interpretation. $\mathcal{RH}_\infty$ is merely the operator theory representation of stable, rational, transfer functions.

Small Gain Theorem

Stability of a linear time-invariant system is determined by location of all poles in the left-half plane. Robust stability in the $\mathcal{H}_\infty$ and $\mu$ frameworks is determined by considering an interconnection of stable operators. The basis for determining stability of these interconnections of operators is the "small gain theorem."

The small gain theorem states that a closed-loop feedback system of stable operators is internally stable if the loop gain of those operators is stable and bounded by unity. Several formulations of the small gain theorem are derived for various signals and systems. Theorem 2.3.1 presents the formulation used for this application.

Figure 2:
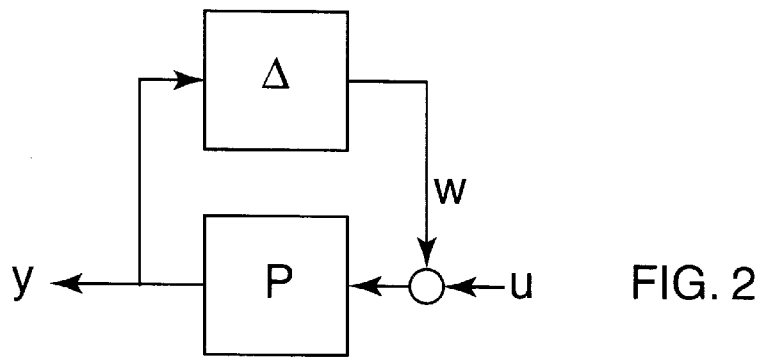
FIG. 2 illustrates a block diagram for the small gain theorem.

Theorem 2.3.1 (Small Gain Theorem): Given the feedback interconnection structure of FIG. 2 for stable transfer-function operators P, $\Delta$: $\mathcal{L}_2 \rightarrow \mathcal{L}_2$ with P, $\Delta \in \mathcal{RH}_\infty$; if the $\mathcal{H}_\infty$-norm of the loop gain is bounded by unity such that $\|P\Delta\|_\infty < 1$, then:

1. the closed-loop system is well-posed and internally stable.
2. a unique y, w $\in \mathcal{L}_\infty$ is associated with each u $\in \mathcal{L}_\infty$.

This small gain theorem is overly restrictive in the sense of requiring P, $\Delta \in \mathcal{RH}_\infty$. A more general small gain theorem is formulated for operators not restricted to lie in the subspace P, $\Delta \in \mathcal{RH}_\infty$; theorem 2.3.1 is a special case of this general theorem. The extended operator space in the general small gain theorem allows consideration of robustness for systems composed of nonlinear and time-varying operators. The requirement of considering stable, rational, transfer-function operators is explicitly stated in the theorem to emphasize that the nominal aeroelastic system considered in this paper is assumed to be stable and the flutter margin is associated with a destabilizing perturbation to that nominal system.

The second condition in theorem 2.3.1 is associated with the first condition guaranteeing a well-posed and stable system. This uniqueness condition can be understood by consideration of the solution y for the loop equations shown in FIG. 2.

$$y = P(u+W) = (I-P\Delta)^{-1} Pu \tag{17}$$

The inverse term, $(I-P\Delta)^{-1}$ has a magnitude of infinity if the norm of $P\Delta$ is allowed to be unity. Such a condition would allow the norm of signal y to be infinite despite a norm-bounded u input signal. Restricting $\|P\Delta\|_\infty < I$ ensures the inverse term exists and a unique finite-norm y is generated in response to a finite-norm u. The issue of well-posedness requires this condition to hold at $s=\infty$ and is automatically considered by the $\mathcal{H}_\infty$-norm.

Robust Stability

The small gain theorem can be directly used to analyze robust stability of a plant model with respect to a set of perturbations. These perturbations are used to describe uncertainty in the analytical plant model caused by errors and unmodeled dynamics. Usually, the exact value of the modeling error is not known, but a norm-bounded, real scalar, $\alpha>0$, can be placed on the size of that error. Define the $\Delta$ of norm-bounded operators describing these perturbations that affect the plant P through a feedback relationship.

$$\Delta = \{\Delta: \|\Delta\|_\infty \leq \alpha\} \tag{18}$$

The small gain theorem allows consideration of the entire set of possible modeling uncertainties as described by all $\Delta \in \Delta$. The $\mathcal{H}_\infty$-norm of the loop gain cannot be explicitly computed for these systems because an infinite number of loop gains $P\Delta$ generated by the $\Delta$ exists. The triangle inequality of norms can be used to generate a sufficient condition for robust stability of P.

$$\|P\Delta\|_\infty \leq \|P\|_\infty \|\Delta\|_\infty \tag{19}$$

A condition for robust stability of the closed-loop system can be stated.

Lemma 2.4.1: The plant P is robustly stable to the set of uncertainty perturbations, $\Delta$, that enter the system as in FIG. 2 with $\|\Delta\|_\infty \leq \alpha$ for all $\Delta \in \Delta$ if $$\|P\|_\infty < 1/\alpha \tag{20}$$

Lemma 2.4.1 shows a sufficient, but not necessary, condition fo robust stability. The structured singular value, $\mu$, is introduced in the next chapter as a less conservative measure of robust stability that is sufficient and necessary.

An excellent illustrative example has previously been presented to demonstrate the issue of robust stability. This example uses classical arguments to compute a robust stability condition for a simple system that is seen to be identical to the robust stability condition generated using the small gain theorem and lemma 2.4.1. A similar example is given below for the feedback interconnection in FIG. 3.

Figure 3:
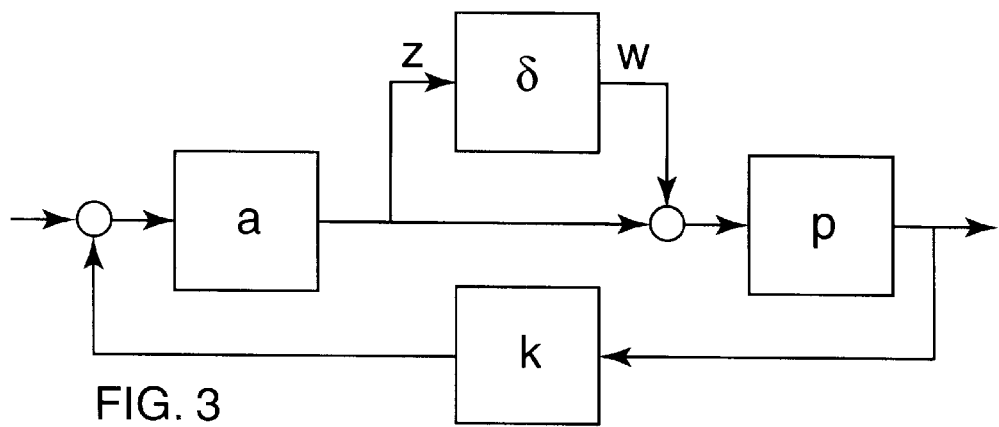
FIG. 3 illustrates a block diagram with uncertainty for the example system.

The single-input and single-output elements in the nominal system model of FIG. 3 are p, which represents the plant dynamics; a, which represents actuator dynamics; and k, which represents a feedback controller. Each of the nominal system elements are stable transfer functions contained in $\mathcal{RH}_\infty$. A modeling error exists on the output of the actuator that is represented by a multiplicative uncertainty operator, $\delta \in \mathcal{RH}_\infty$, on the output of the element a.

The transfer function from w to z can be computed as follows.

$$z=(-(1+akp)^{-1}akp)w \quad (21)$$

Internal stability of the closed-loop feedback system is equivalent to stability of the feedback system shown in FIG. 4a with the operator $g=-(1+akp)^{-1}akp$.

Because the operators $\delta$ g $\in \mathcal{RH}_\infty$ are stable, the Nyquist criterion determines the closed-loop system is stable if and only if the Nyquist plot of $\delta g$ does not encircle the $-1$ point. This stability condition is equivalent to the following norm condition.

$$\sup|g(j\omega)\delta(j\omega)|<1 \quad (22)$$

This condition is an $\mathcal{H}_\infty$-norm condition on the loop gain, $g\delta$. Thus, classical Nyquist arguments derive an $\mathcal{H}_\infty$-norm condition that is equivalent to the stability condition immediately formulated by applying the small gain theorem.

$$\text{closed-loop stability} \rightarrow \|g\delta\|_\infty < 1 \quad (23)$$

The error in the actuator command is unknown and possibly time-varying, so the operator $\delta$ is used to allow consideration of a range of errors. Assume the actuator is weighted such that the range of errors is described by the set of perturbations, $\|\delta\|_\infty<1$. Lemma 2.4.1 is used to generate a condition that ensures the system is robustly stable to all actuators errors described by $\delta$.

$$\text{closed-loop stability} \leftarrow \|g\|_\infty < 1 \quad (24)$$

3. STRUCTURED SINGULAR VALUE
Linear Fractional Transformations

The linear fractional transformation (LFIF) is a common framework suitable for robust stability analysis using arguments based on the small gain theorem. An LFT is an interconnection of operators arranged in a feedback configuration. These operators can be constant matrices, time-domain state-space systems, or frequency-varying transfer functions. Consider a linear operator $P \in C^{(o_1+o_2)\times(i_1+i_2)}$ that is partitioned into four elements.

$$P = \begin{bmatrix} P_{11} & P_{12} \\ P_{21} & P_{22} \end{bmatrix} \quad (25)$$

The LFT, $F_u(P,\Delta)$, is defined as the interconnection matrix such that the upper loop of P is closed with the operator $\Delta \in C^{i_1 \times o_1}$.

Figure 5A:
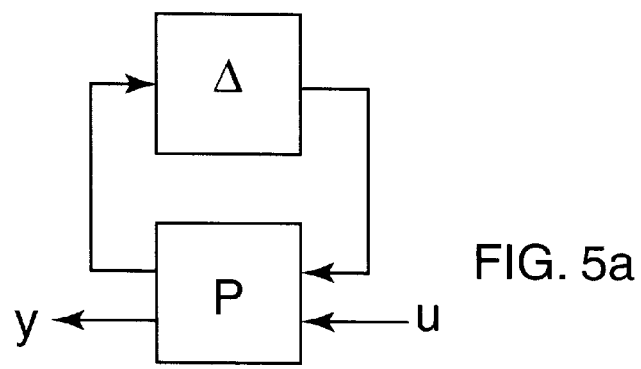
FIG. 5a illustrates a linear fractional transformation $F_u(P, \Delta)$.

Definition 3.1.1: Given $P \in C^{(o_1+o_2)\times(i_1+i_2)}$ and $\Delta \in C^{i_1 \times o_1}$ define $F_u(P,\Delta)$ as the upper-loop LFT of P closed with $\Delta$ such that $y=F_u(P,\Delta)$ u as in FIG. 5a.

$$F_u(P,\Delta)=P_{22}+P_{21}\Delta(I-P_{11}\Delta)^{-1}P_{12} \quad (26)$$

A similar LFT is defined as $F_l(P,\Delta)$ to represent the interconnection matrix of the lower loop of P closed with an operator $\Delta \in C^{i_2 \times o_2}$.

Figure 5B:
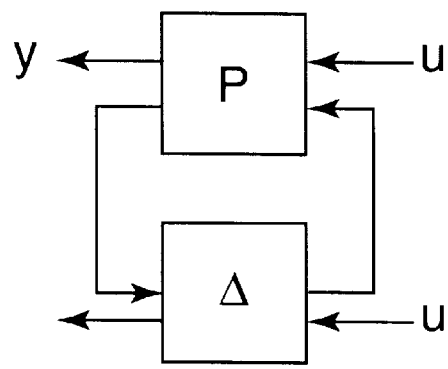
FIG. 5b illustrates a linear fractional transformation $F_l(P,\Delta)$.

Definition 3.1.2: Given $P \in C^{(o_1+o_2)\times(i_1+i_2)}$ and $\Delta \in C^{i_2 \times o_2}$, define $F_u(P,\Delta)$ as the lower-loop LFT of P closed with $\Delta$ such that $y=F_l(P,\Delta)$ u as in FIG. 5b.

$$F_l(P,\Delta)=P_{11}+P_{12}\Delta(I-P_{22}\Delta)^{-1}P_{21} \quad (27)$$

An example of an interconnection that is common in stability analysis is the representation of a time dependent state-space system as frequency-varying transfer function. Define S as the constant matrix whose entries are the ($A_P$, $B_P$, $C_P$, $D_P$) matrices of a state-space realization. The transfer function can be written as an upper-loop LFT involving S and the Laplace transform variable s where 1/s over s is an integrator.

$$\begin{aligned}\dot{x} &= A_P x + B_P u \\ y &= C_P x + D_P u\end{aligned} \Rightarrow S = \begin{bmatrix} A_P & B_P \\ C_P & D_P \end{bmatrix} \Rightarrow \begin{aligned}P(s) &= D_P + C_P(sI - A_P)^{-1}B_P \\ &= F_u\left(S, \frac{1}{s}\right)\end{aligned} \quad (28)$$

The LFT is a useful framework for analyzing complex systems with many feedback and series interconnections of operators. Property 3.1.3 shows the main property of LFTs that will used herein. This property allows complex systems of several interconnected LFTs to be expressed as an equivalent single LFT. The operators of the new LFT are block-structured with blocks composed of the individual operators of the LFTs from the original system.

Property 3.1.3: Feedback and series interconnections of LFTs can be formulated as a single LFT.

This issue of stability for LFT systems is associated with the concept of a well-posed interconnection. Stability analysis based on the small gain theorem given in theorem 2.3.1 can be used to guarantee the LFT is stable and well-posed.

Structured Uncertainty

The concept of uncertainty is formulated as a set of norm-bounded operators, $\Delta$, associated with a nominal plant, P, through an LFT feedback relationship. A family of plants, $\mathcal{P}$ arises through consideration of $F_u(P,\Delta)$ for every $\Delta \in \Delta$. The true plant model is assumed to lie within this family of plants.

Modeling the uncertainty as a norm-bounded operator can lead to overly conservative models. The uncertainty description can be made more accurate by including frequency information. Formulating a model of a physical system that is accurate at low frequencies but less accurate for representing the system response at high frequencies is often possible. A frequency-varying transfer function, W, is generally associated with each uncertainty element to describe magnitude and phase uncertainty as it varies with frequency.

Figure 6A:
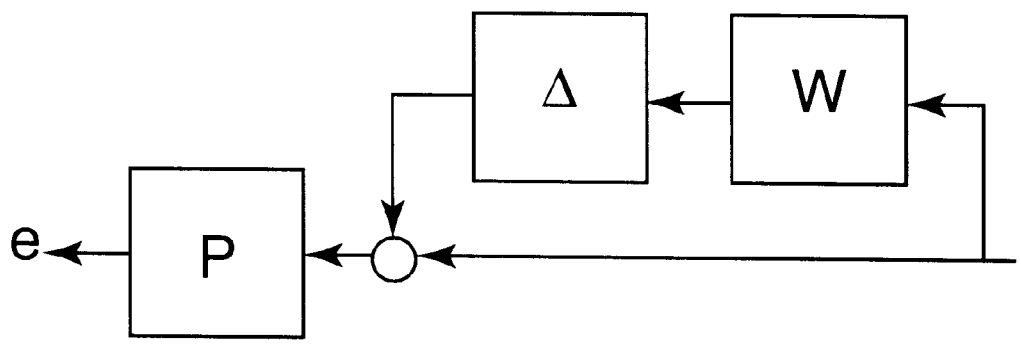
FIG. 6a illustrates a family of plants $P=P(I+\Delta W)$ with input multiplicative uncertainty.
Figure 6B:
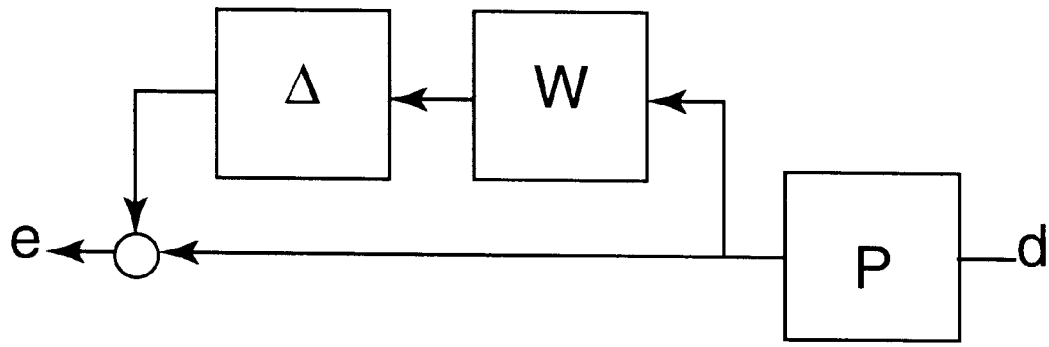
FIG. 6b illustrates a family of plants $P=P(I+\Delta W)P$ with output multiplicative uncertainty and FIG. 6c illustrates a family of plants $P=P+\Delta W$ with additive uncertainty.
Figure 6C:
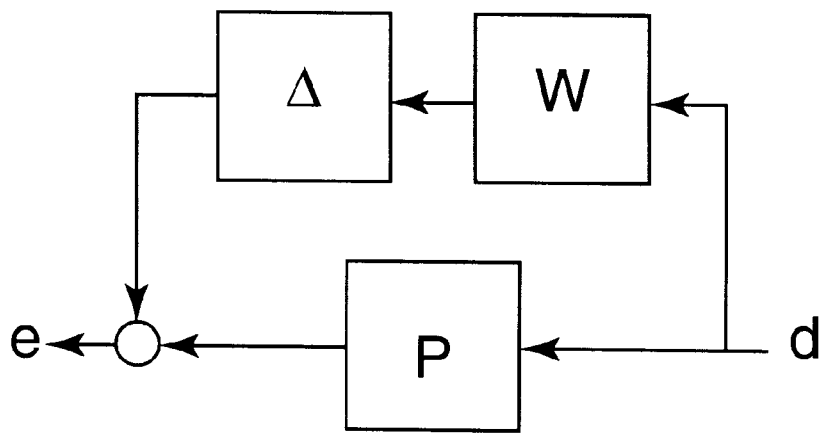

Uncertainty can enter a system model in a linear fractional manner in several general ways. Two typical types of uncertainty are termed "multiplicative" and "additive" uncertainty. Multiplicative uncertainty can be either on the input or output of a system. Systems with these types of uncertainty are easily described in block diagram form. FIG. 6a shows the LFT for a plant with input multiplicative uncertainty. FIG. 6b shows the plant with output multiplicative uncertainty. FIG. 6c shows additive uncertainty.

Uncertainty can also be associated with specific elements of the system. These parametric uncertainties are usually associated with a system operator in a feedback relationship. The number of input and output signals of the system operator is increased to account for the additional feedback signals associated with the uncertainty operator. This operation can be demonstrated by considering P generated by a system with an unknown pole.

$$\mathcal{P} = \left\{\frac{1}{(s+1)(s+x)} : x \in [2,3]\right\} \quad (29)$$

A norm-bounded, real, scalar, uncertainty parameter $\delta$ can be introduced to account for the possible variation in pole value. The set of plants can be written in the LFT framework using this uncertainty operator and definition 3.1.1.

$$\mathcal{P} = \left\{ F_u(P, \delta): P = \begin{bmatrix} \frac{-1}{s+2.5} & \frac{-1}{s+2.5} \\ \frac{1}{(s+1)(s+2.5)} & \frac{1}{(s+1)(s+2.5)} \end{bmatrix}, \quad (30) \right.$$

$$\left. \|\delta\|_\infty \le 1, \delta \in R \right\}$$

A complex system with several uncertainty operators can be expressed as an LFT with a single uncertainty operator using property 3.1.3. This operator is structured as a block-diagonal operator with each block associated with the individual uncertainty operators. Two main types of uncertainty blocks exist. A full-block uncertainty is a matrix with unknown elements. This type of block is used to describe unstructured uncertainty in a group of signals.

Definition 3.2.1: A full-block uncertainty, $\Delta \in C^{n \times m}$, has unknown elements $\Delta_{ij}$ for every $i \in (1,n)$ and $j \in (1,m)$.

A repeated-scalar block introduces more structure into the uncertainty description than a full block does. Only the diagonal elements of the matrix contain unknown elements; the remaining elements are zero. Furthermore, the diagonal elements are identical. This type of uncertainty is used to relate inpu-output signal pairs with the same uncertainty parameter.

Definition 3.2.2: A repeated-scalar block uncertainty $\Delta \in C^{n \times n}$ has zero-valued elements except an unknown parameter $\delta$ along the diagonal such that $\Delta = \delta 1_n$, A scalar block is a repeated-scalar block of dimension 1.

The single structured uncertainty block used for robust stability analysis is formally defined in terms of these blocks. Let integers m, n, and p define the number of real scalar, complex scalar, and complex full blocks respectively. Define integers $R_1, \ldots, R_m$ such that the $i^{th}$ repeated-scalar block of real, parametric uncertainty is of dimension $R_i$ by $R_j$. Define similar integers $C_1, \ldots, C_n$ to denote the dimension of the complex repeated-scalar blocks. The structured uncertainty description $\Delta$ is assumed to be norm-bounded and belonging to the following set.

$$\Delta = \{\Delta = diag(\delta_1^R I_{R_1}, \ldots, \delta_m^R I_{R_m}, \delta_1^C I_{C_1}, \ldots, \delta_n^C I_{C_n}, \Delta_1, \ldots, \Delta_p): \quad (31)$$

$$\delta_i^R \in R, \delta_i^C \in C, \Delta_i \in C^{c_i \times c_i}\}$$

Real parametric uncertainty is allowed to enter the problem as scalar or repeated-scalar blocks. Complex uncertainty enters the problem as scalar, repeated-scalar, or full blocks. Complex uncertainty parameters allow uncertainty in magnitude and phase to be modeled; uncertainty in physical characteristics can be more accurately modeled with real parameters. The robustness analysis will be less conservative by accounting for this structure to accurately describe the model uncertainty.

Structured Singular Value

Figure 7:
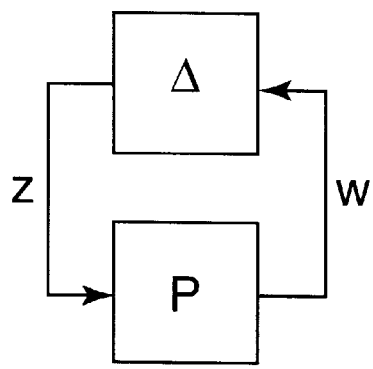
FIG. 7 illustrates a linear fractional transformation system for robust stability analysis using $\mu$.

FIG. 7 shows the general framework for robust stability analysis. The plant operator $P(s) \in \mathcal{RH}$ is a stable, rational, transfer-function matrix representing the aeroelastic dynamics. A norm-bounded $\Delta \in \mathcal{RR}_\infty$ is described such that $\Delta(s) \in \Delta$ describes the modeling errors in P through a feedback relationship.

The robustness of P with respect to the $\Delta$ can be determined using the small gain theorem as presented in lemma 2.4.1. This condition guarantees stability for any value $\Delta \in \Delta$ if $\|P\|_\infty < 1$. This robustness condition can be overly conservative because it does not account for structure in the uncertainty operator. The structured singular value, $\mu$, is defined as an alternative measure of robustness.

Definition 3.3.1

Given the complex transfer-function matrix $P \in \mathcal{RH}_\infty$ and associated norm-bounded set of uncertainty operators $\Delta$, define $\mu$.

$$\mu(P) = \frac{1}{\min_{\Delta \in \Delta} \{\bar{\sigma}(\Delta): \det(I - P\Delta) = 0\}} \quad (32)$$

Define $\mu = 0$ if no $\Delta \in \Delta$ exists such that $\det(I-P\Delta)=0$.

The structured singular value is an exact measure of robust stability for systems with structured uncertainty. The value of $\mu$ determines the allowable size of uncertainty matrices for which the plant is robustly stable as demonstrated in theorem 3.3.2.

Theorem 3.3.2

Given the system in FIG. 7, P is robustly stable with respect to the $\Delta$, which is norm-bounded by real scalar $\alpha$ such that $\|\Delta\|_\infty \le \alpha$ for all $\Delta \in \Delta$ if and only if $\mu(P) < 1/\alpha$.

The model P is usually internally weighted such that the range of modeling errors is described by the uncertainty set $\Delta$, which is norm-bounded by 1.

$$\|\Delta\|_\infty \le 1 \text{ for all } \Delta \in \Delta \quad (33)$$

Theorem 3.3.3 presents the specific condition for robust stability that will be used for unity norm-bounded uncertainty sets.

Theorem 3.3.3

Given the system in FIG. 7, P is robustly stable with respect to the $\Delta$ with $\|\Delta\|_\infty \le 1$ for all $\Delta \in \Delta$ if and only if $\mu(P) < 1$.

A value of $\mu < 1$ implies no perturbation within $\Delta$ exists that will destabilize the feedback system. This condition can also be interpreted as saying the true plant dynamics are stable, assuming these dynamics lie within the range generated by the nominal model dynamics coupled with the set of modeling errors.

Obviously, $\mu$ is dependent on the block structure of $\Delta$. The robust stability properties computed by $\mu$ will only be accurate if a realistic uncertainty operator is chosen. The structured singular value may be arbitrarily greater when computed with respect to an unstructured uncertainty operator as compared to a highly structured uncertainty operator. Definition 3.3.1 demonstrates the $\mu$ condition of theorem 3.3.3 is equivalent to the small gain condition of lemma 2.4.1 when the uncertainty is unstructured.

Unfortunately, $\mu$ is a difficult quantity to compute. Closed-form solutions exist to exactly compute $\mu$ for only a small number of block structures for $\Delta$. Upper and lower bounds are used to compute $\mu$ for generalized uncertainty block structures.

4. ROBUST FLUTTER MARGINS

Nominal Aeroelastic Model

Consider the generalized equation of motion for the structural response of the aircraft.

$$M[\$]\$\ddot{g}\ddot{h} + C\dot{\eta} + K\eta + \bar{q}Q(s)\eta = 0 \quad (34)$$

For a system with n modes, define $M \in R^{n \times n}$ as the mass matrix, $C \in R^{n \times n}$ as the damping matrix, and $K \in R^{n \times n}$ as the stiffness matrix. Define $\bar{q} \in R$ as a scalar representing the dynamic pressure, and $Q(S) \in C^{n \times n}$ as the matrix of unsteady aerodynamic forces. This equation is valid for a particular Mach number, with a different Q(s) describing the unsteady aerodynamic forces at a different Mach number.

Values of the aerodynamic force matrix at distinct frequencies can be derived using finite-element models of the aircraft and panel methods for unsteady force calculations. This research uses a computer program developed for NASA known as STARS. This code solves the subsonic aerodynamic equations using the doublet-lattice method. The supersonic forces are generated using a different approach known as the constant panel method.

Formulating a linear time-invariant representation of the aerodynamic forces to incorporate them into the robust stability framework is desired. Padé approximations can be used to compute a rational function approximation to the transfer-function matrix.

$$Q_s = A_0 + sA_1 + s^2 A_2 + \frac{s}{s+\beta_1} A_3 + \frac{s}{s+\beta_2} A_4 \tag{35}$$

This form is often referred to as Roger's form. The equation presented here includes only two lag terms, although more terms can be included. The poles of the lag terms, $\beta_1$, and $\beta_2$, are restricted to be real and positive to maintain system stability. The matrix elements of Roger's form can be computed using a least-squares algorithm to fit the frequency-varying aerodynamic data.

The aerodynamic lag terms can be replaced in the formulation with a finite-dimensional state-space system represented by a transfer-function matrix using Karpel's method.

$$Q(s) = A_0 + sA_1 + s^2 A_2 C_Q (sI - A_Q)^{-1} B_Q s \tag{36}$$

Standard system identification algorithms, including curve-fitting or least-squares approaches, can be used to compute the elements in the state-space portion of the formulation. The $A_i$ matrices are assumed to be known from the low-frequency aerodynamic force data or from experimental wind-tunnel data.

A matrix fraction approach is also formulated to represent the aerodynamic forces as a linear time-invariant system. This generalized form computes rational matrix polynomials in a fractional form using a least-squares algorithm. Roger's form and Karpel's form can be shown to be subsets of the matrix fractional form.

The approach taken in this application is to fit the aerodynamic force matrices to a single, finite-dimensional, state-space system. This form is most similar to Karpel's form, except the additional $A_i$ matrices are not explicitly accounted for in the formulation.

$$Q(s) = \begin{bmatrix} A_Q & B_Q \\ C_Q & D_Q \end{bmatrix} = D_Q + C_Q (sI - A_Q)^{-1} B_Q \tag{37}$$

Given the number of generalized states, n, and the number of aerodynamic states, $n_Q$, define $A_Q \in R^{n_Q \times n_Q}$, $B_Q \in R^{n_Q \times n}$, $C_Q \in R^{n \times n_Q}$, and $D_Q \in R^{n \times n}$ as the elements of the state-space and system approximating Q(s).

Fitting the aerodynamic data to a finite-dimensional state-space system is equivalent to fitting each term in the matrix to a real, rational, proper, transfer function. This method seems to contradict the methods of Roger and Karpel, which form nonproper transfer functions caused by the terms in s and $s^2$. An approximation to these forms allows them to fall within the framework of the method used. Including a high-frequency pole in the nonproper term, such as replacing s with $$\frac{s}{s+10000},$$

would not affect the low-frequency region of interest while ensuring stable and proper functions. With the approximation, the forms of Roger and Karpel can be shown to be subsets of this method.

Standard frequency-domain system identification algorithms can generate a system with an arbitrarily large number of states. This state dimension does not greatly affect the computational cost of the robust stability analysis. Extending the robustness analysis to controller synthesis, however, places an emphasis on limiting the state dimension. imiting the number of states in the identification process is not directly considered here, although standard model reduction techniques can be used on the state-space system to lower the state dimension.

Generating a state-space representation of the aeroelastic system, including the state-space form of the unsteady aerodynamic forces, is straightforward. Consider the force vector, y, generated by the state vector, $\eta$. Define $x \in R^{n_Q}$ as the vector of aerodynamic states.

$$y = Q(s)\eta \Leftrightarrow \begin{bmatrix} \dot{x} \\ y \end{bmatrix} = \begin{bmatrix} A_Q & B_Q \\ C_Q & D_Q \end{bmatrix} \begin{bmatrix} x \\ \eta \end{bmatrix} \tag{38}$$

Using x, formulate the aeroelastic differential equation.

$$0 = M[|\$]\$\"g\ddot{n} + C\dot{\eta} + K\eta + \bar{q}Q(s)\eta = M[|\$]\$\"g\ddot{n} + C\dot{\eta} + K\eta + \bar{q}y =$$
$$M[|\$]\$\"g\ddot{n} + C\dot{\eta} + K\eta + \bar{q}(C_Q x + D_Q \eta) = M\ddot{\eta} + C\dot{\eta} + (K+\bar{q}D_Q)\eta + \bar{q}C_Q(39)$$

A state-space system is formulated using the generalized states, $\eta$ and $\dot{\eta}$, and the unsteady aerodynamic states, x. The state-update matrix is determined by the following three differential equations.

$$\begin{bmatrix} \dot{\eta} \\ \ddot{\eta} \\ \dot{x} \end{bmatrix} = \begin{bmatrix} 0 & I & 0 \\ -M^{-1}(K+\bar{q}D_Q) & -M^{-1}C & -\bar{q}M^{-1}C_Q \\ B_Q & 0 & A_Q \end{bmatrix} \begin{bmatrix} \eta \\ \dot{\eta} \\ x \end{bmatrix} \tag{40}$$

Nominal Aeroelastic Model in the Structured Singular Value Framework

The generalized equation of motion for the nominal aeroelastic system can be expressed in a form suitable for using $\mu$ analysis to compute a flutter margin. The flutter margin is dependent on the flight condition parameters that result in a flutter instability, and $\mu$ is defined to be the smallest perturbation among the $\Delta$ set that causes an instability. The obvious approach to formulating flutter analysis in the $\mu$ framework is to introduce a perturbation to a flight condition parameter and find the smallest perturbation that causes an instability.

Essentially, the two subsystems in the nominal aeroelastic model are composed of the structural dynamics, involving mass, damping, and stiffness matrices; and the unsteady aerodynamics scaled by the dynamic pressure. The generalized equation of motion demonstrates the dynamic pressure linearly affects the dynamics at a constant Mach condition. Perturbations to dynamic pressure can thus enter the system through a feedback operator in a linear fractional manner that is perfectly suited to $\mu$ analysis.

Consider an additive perturbation, $\delta_{\bar{q}} \in R$, on the nominal dynamic pressure, $\bar{q}_0$.

$$\bar{q} = \bar{q}_0 + \delta_q \quad (41)$$

Separate terms in the system dynamics that involve $\delta_{\bar{q}}$.

$$0 = M[|\$]\$"g\ddot{h} + C\dot{\eta} + (K + \bar{q}D_Q)\eta + \bar{q}C_Q x$$
$$= M\ddot{\eta} + [C\dot{\eta} + (K + \bar{q}_0 D_Q)\eta + \bar{q}_0 C_Q x] + \delta_q[D_Q\eta + C_Q x]$$
$$= \ddot{\eta} + [M^{-1}C\dot{\eta} + M^{-1}(K + \bar{q}_0 D_Q)\eta + \bar{q}_0 M^{-1}C_Q x]$$
$$+ \delta_q[M^{-1}D_Q\eta + M^{-1}C_Q x]$$
$$= \ddot{\eta} + [M^{-1}C\dot{\eta} + M^{-1}(K + \bar{q}_0 D_Q)\eta + \bar{q}_0 M^{-1}C_Q x] + \delta_q z$$
$$= \ddot{\eta} + [M^{-1}C\dot{\eta} + M^{-1}(K + \bar{q}_0 D_Q)\eta + \bar{q}_0 M^{-1}C_Q x] + w \quad (42)$$

The signals z and w are introduced into this formulation to associate the perturbation in dynamic pressure to the nominal dynamics in a feedback manner. The signal z can be generated as an output of the plant because z is a linear combination of states.

$$z = M^{-1} D_Q \eta + M^{-1} C_Q x \quad (43)$$

The signal w is related to z by the dynamic pressure perturbation.

$$w = \delta_q z \quad (44)$$

The state-space aeroelastic model for nominal stability analysis in the $\mu$ framework is formulated using the state-update matrix. This matrix is determined by the dynamics at the nominal dynamic pressure, and the additional input and output signals that introduce perturbations to the dynamic pressure. That perturbation, $\delta_{\bar{q}}$, is not an explicit parameter in the state-space model because $\delta_{\bar{q}}$ only affects the plant through a feedback relationship as deten-nined by the signals z and w. Define the transfer function P(s) generated by state-space matrices such that $z = P(s)w$.

$$\begin{bmatrix} \dot{\eta} \\ \ddot{\eta} \\ \dot{x} \\ \bar{z} \end{bmatrix} = \begin{bmatrix} 0 & I & 0 & 0 \\ -M^{-1}(K + \bar{q}_0 D_Q) & -M^{-1}C & -\bar{q}M^{-1}C_Q & -1 \\ B_Q & 0 & A_Q & 0 \\ \hline M^{-1}D_Q & 0 & M^{-1}C_Q & 0 \end{bmatrix} \begin{bmatrix} \eta \\ \dot{\eta} \\ x \\ w \end{bmatrix} \quad (45)$$

Figure 8:
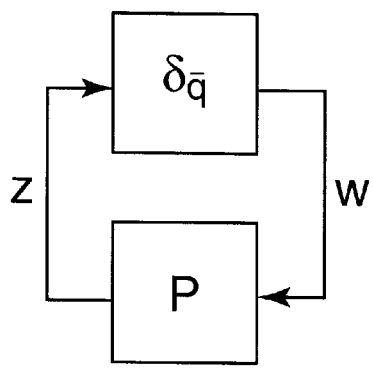
FIG. 8 illustrates a linear fractional transformation system for nominal stability analysis in the $\mu$ framework with parameterization around perturbation in dynamic pressure.

FIG. 8 shows the feedback interconnection between the perturbation in dynamic pressure and the nominal plant model parameterized around that perturbation. This interconnection is an LFT, and the small gain condition of lemma 2.4.1 or the $\mu$ condition of theorem 3.3.3 can be directly applied to analyze stability with respect to a variation in the flight condition $\bar{q}$.

Formulating the nominal aeroelastic dynamics in the $\mu$ framework immediately demonstrates the procedure used in computing a flutter margin. Traditional flutter analysis algorithms such as the p-k method and the $\mu$ method as applied to FIG. 8 are searching for a value of dynamic pressure that results in a flutter instability. The nominal flutter margin question may be posed, which is answered by these methods.

Question 4.2.1
Nominal Flutter Margin
What is the largest perturbation to dynamic pressure for which the nominal aeroelastic dynamics are stable?

The dimension of the uncertainty block is the dimension of the signal z. The state-space equations for P(s) demonstrate this dimension is the number of modes in the system, n. The number of free variables in the $\mu$ upper-bound optimization, and consequently the computational cost of $\mu$, is a function of the uncertainty dimension. In this way, the number of aerodynamic states, $n_Q$, does not directly affect the cost of the flutter estimation. The only cost increase caused by these additional states is computing the frequency response of the state-space matrix, which is generally much lower than the cost of computing $\mu$.

Demonstrating the aeroelastic system formulated in the $\mu$ framework in FIG. 8 is straightforward. The dynamic pressure parameterization is equivalent to the nominal state-space system given in the previous section. Simply compute the closed-loop transfer function with no uncertainty, $\delta_{\bar{q}} = 0$, and the nominal system is recovered.

Wind-tunnel and ground vibration testing can experimentally determine aerodynamic stiffness and damping matrices that are more accurate than the matrices approximated by a finite-element model. These matrices can be incorporated into a nominal state-space model in the $\mu$ framework.

This procedure considers variations in dynamic pressure for an aeroelastic model at constant Mach number. The unsteady aerodynamics are highly nonlinear with variation in Mach number, and attempts to model Mach variations in an LFT may produce highly conservative flutter margins. The $\mu$ method presented herein is considering flutter margins in terms of dynamic pressure as measured along lines of constant Mach. Flutter is a function of the two variables, dynamic pressure and Mach, so computing the dynamic pressure causing flutter for a dense set of discrete Mach values will generate an accurate portrait of the flutter margins.

Robust Aeroelastic Model in the Structured Singular Value Framework

A robust aeroelastic model in the $\mu$ framework can be generated by associating uncertainty operators, $\Delta$, with the nominal model and including the parameterization around a perturbation in dynamic pressure. These uncertainty operators can resemble any of the forms presented in section 3.2, including parametric uncertainty and additive and multiplicative representations of dynamic uncertainty.

Choosing a reasonable uncertainty description is crucial for determining a valid robust flutter margin. This choice can arise logically from consideration of weaknesses in the modeling process, previous experience with aeroelastic analysis, and comparison with observed flig.",- dynamics. The following section 5 on UNCERTAINTY DESCRIPTIONS IN AEROELASTIC MODELS gives a noncomprehensive examination of several obvious uncertainty descriptions that may be associated with an aeroelastic model.

The LFT is a valuable framework for formulating the robust aeroelastic model so that the model is suitable for $\mu$ analysis. The various system blocks composed of the nominal state-space model with associated uncertainties and any additional subsystem blocks and their associated uncertainties can be expressed as a single model and uncertainty operator.

Figure 9:
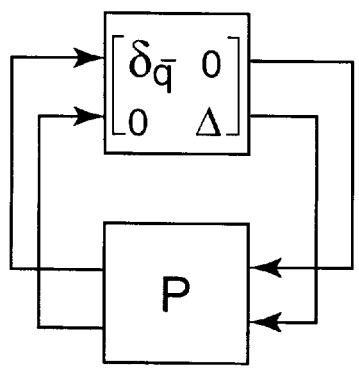
FIG. 9 illustrates a linear fractional transformation system for robust stability analysis in the $\mu$ framework with parameterization around perturbation in dynamic pressure and structured uncertainty.

FIG. 9 shows the block structure used for $\mu$ analysis of the uncertain aeroelastic system. The structured singular value is computed with respect to a single, block-diagonal, structured operator that contains the perturbation to dynamic pressure and the structured uncertainty operator along the diagonal. The perturbation to dynamic pressure is explicitly shown to distinguish $\delta_{\bar{q}}$ from the modeling uncertainty and emphasize $\delta_{\bar{q}}$ as a special operator used to describe a range of flight conditions.

The flutter margin computed for the uncertain system (FIG. 9) is a more accurate margin than one computed with traditional methods such as p-k. These traditional methods address the nominal flutter problem in question 4.2.1; the robust flutter margin must consider the effect of the modeling uncertainty. The robust flutter margin actually finds the smallest perturbation to dynamic pressure for the entire set of plants formulated by the interconnection of the nominal dynamics and all elements $\Delta \epsilon \Delta$. Question 4.3.1 poses how to compute these margins.

Question 4.3.1

Robust Flutter Margin

What is the largest perturbation to dynamic pressure for which the nominal aeroelastic dynamics are robustly stable to the entire range of modeling errors as described by the norm-bounded $\Delta$?

This question can be answered by computing $\mu$ for the system in FIG. 9.

Computing a Flutter Margin with the Structured Singular Value

The nominal flutter problem posed by question 4.2.1 and the robust flutter problem posed by question 4.3.1 can be solved as a $\mu$ computation. The value of $\mu$ is a sufficient direct indication of the flutter margin for the nominal system; additional information regarding the norm bound on the uncertainty is required to derive the robust flutter margin.

The nominal aeroelastic model is formulated for stability analysis in the g framework in section 4.2 by introducing a perturbation, $\delta_{\bar{q}}$, to dynamic pressure. A nominal flutter margin is computed to answer question 4.2.1 by considering the smallest value of this perturbation that destabilizes the model. The nominal flutter pressure can be directly calculated by computing $\mu$ with respect to the perturbation operator $\delta_{\bar{q}}$.

The exact value of g can be analytically formulated to compute a nominal flutter pressure because a closed-form solution for $\mu$ with respect to a single, real, scalar operator is known. This solution is the spectral radius of the frequency-varying transfer-function matrix.

$$\mu(P) = \max_{\omega \in R} \rho(P(j\omega)) \qquad (46)$$

The spectral radius of $P(j\omega)$ is a discontinuous function of frequency, so computational algorithms based on searches over a finite set of frequency points may not guarantee the correct computation of robustness values. A small amount of complex uncertainty can be added to the real uncertainty that allows a continuous $\mu$ function to be analyzed but introduces unrealistic conservatism. An heuristic robustness indicator can be substituted for $\mu$ that considers stability over a frequency segment but is not considered here.

A relatively simple approach can be used to compute $\mu$ with respect to a single real parameter by considering the destabilizing value of the parameter. A search over the parameter space will result in computation of $\mu$ and the desired flutter margin. Lemma 4.4.1 presents the principle of this approach.

Lemma 4.4.1

Given the plant, P, derived at nominal dynamic pressure, $\bar{q}_0$, with a perturbation to dynamic pressure, $\delta_{\bar{q}}$, arranged in the feedback relationship of FIG. 9 define $\delta$.

$$\delta = \min_{\delta_{\bar{q}} > 0} \{\delta_{\bar{q}} : F_u(P, \delta_{\bar{q}}) \text{ is unstable}\}$$

Then $\mu(P)=1/\delta$ such that $\bar{q}_{flutter}^{nom}=\bar{q}_0+\delta$ is the nominal flutter pressure and $$\Gamma_{nom}=\delta$$

represents the nominal flutter margin answering question 4.2.1.

Proof

This result is immediately obvious using definition 3.3.1 for $\mu$ with respect to a scalar uncertainty parameter $\delta_{\bar{q}}$. The $\mu$ is the inverse of the smallest destabilizing perturbation, and $\delta$ is computed as the smallest value of $\delta_{\bar{q}}$ that destabilizes P; thus $\mu(P)=1/\delta$. □

Lemma 4.4.1 indicates a computational strategy to compute a nominal flutter margin that does not require a search over a set of frequency points. The flutter pressure is found by increasing values of $\delta_{\bar{q}}$ until an eigenvalue of the state matrix of $F_u(P,\delta_{\bar{q}})$ has a negative real part indicating $F_u(P,\delta_{\bar{q}})$ is unstable. Algorithm 4.4.2 demonstrates a bisection search implementation that efficiently computes upper and lower bounds on the minimum destabilizing $\delta_{\bar{q}}$ perturbation to within a desired level of accuracy.

Figure 4:
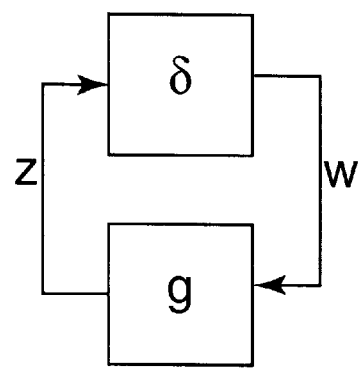
FIG. 4 illustrates a block diagram for robust stability analysis of the example system using the small gain theorem.

Algorithm 4.4.2 (nominal flutter margin):

Given plant P at nominal dynamic pressure, $\bar{q}_o$, affected by perturbation $\delta_{\bar{q}}$ as in FIG. 4.1:

Define scalars $\delta_{upper} > \delta_{lower} > 0$ as bounds on the smallest destabilizing $\delta_{\bar{q}}$.

Define scalar $\epsilon > 0$ for accuracy.

while $(\delta_{upper} - \delta_{lower} > \varepsilon)$ {

$$\delta_{\bar{q}} = \frac{1}{2}(\delta_{upper} + \delta_{lower})$$

if $F_u(P, \delta_{\bar{q}})$ has an unstable pole), then $\delta_{upper} = \delta_{\bar{q}}$ else $\delta_{lower} = \delta_{\bar{q}}$

}

$\bar{q}_{flutter}^{nom} = \bar{q}_o + \delta_{upper}$ $\Gamma_{nom} = \delta_{upper}$ Robust flutter margins that address question 4.3.1 cannot be computed using algorithm 4.4.2 because an additional search over the set of uncertainty operators $\Delta$ must be included. These margins must be computed using the augmented plant P, which includes feedback signals relating the perturbation to dynamic pressure and the uncertainty description as shown in FIG. 9. Define the block-structured set of operators $\bar{\Delta}_{\delta_q}$, which considers a particular perturbation $\delta_{\bar{q}}$ and set of operators $\Delta$ describing model uncertainty—

$$\bar{\Delta}_{\delta_{\bar{q}}} = \left\{ \bar{\Delta}_{\delta_{\bar{q}}} : \bar{\Delta}_{\delta_{\bar{q}}} = \begin{bmatrix} \delta_{\bar{q}} & 0 \\ 0 & \Delta \end{bmatrix}, \Delta \in \Delta, \|\Delta\|_\infty \le 1 \right\} \qquad (47)$$

A set of plant models, $F_u(P, \bar{\Delta}_{\delta_q})$, exists for each value of $\delta_{\bar{q}}$ that defines the nominal plant at dynamic pressure $\bar{q}=\bar{q}_0+\delta_{\bar{q}}$ and variations to that plant caused by the set of uncertainties $\Delta$. The robust flutter margin corresponds to the smallest perturbation $\delta_{\bar{q}}$ for which an unstable plant, $F_u(P, \bar{\Delta}_{\delta_q})$, exists with $\bar{\Delta}_{\delta_q} \in \bar{\Delta}_{\delta_q}$. If every member of the set of plants $F_u(P, \bar{\Delta}_{\delta_q})$ is stable, then $\bar{q}=\bar{q}_0+\delta_{\bar{q}}$ is not a flutter pressure and P formulated at $\bar{q}$ is robustly stable to the uncertainty description $\Delta$.

The smallest destabilizing perturbation $\delta_{\bar{q}}$ corresponding to a robust flutter margin can be computed by a $\mu$ computation. The $\mu$ framework analyzes robustness with respect to a single, structured operator, so the operator set used to compute a robust flutter margin must contain the set of uncertainty operators $\Delta$ along with a range of dynamic pressure perturbations. The $\mu$ will compute the robustness of P with respect to this operator set to find the smallest destabilizing perturbation to dynamic pressure and the smallest destabilizing uncertainty operator. Define the $\Delta$ that contains $\bar{\Delta}_{\delta_q}$ sets for a norm-bounded set of $\delta_{\bar{q}}$ operators.

$$\bar{\Delta} = \left\{ \bar{\Delta} : \bar{\Delta} = \begin{bmatrix} \delta_{\bar{q}} & 0 \\ 0 & \Delta \end{bmatrix}, \Delta \in \Delta, \|\Delta\|_\infty \leq 1, \|\delta_{\bar{q}}\|_\infty \leq 1 \right\} \quad (48)$$

Imposing the norm bound for $\delta_{\bar{q}}$ operators as $\|\delta_{\bar{q}}\|_\infty \leq 1$ may seem overly restrictive because the units of $\delta_{\bar{q}}$ are the same as the units of $\bar{q}$ in the model. This condition implies the $\bar{\Delta}$ considers the range of flight conditions $\bar{q} = \bar{q} \pm 1$ lbf/ft$^2$ for plants formulated by dynamic pressure in units of lbf/ft$^2$. Such a small range of flight conditions is not useful for stability analysis unless $\bar{q}_0$ is extremely close to the flutter pressure. This limitation is avoided by introducing a weighting function, $W_{\bar{q}}$, to the computation of $\bar{q}$.

$$\bar{q} = \bar{q}_0 = W_q \delta_q \quad (49)$$

A $W_{\bar{q}} > 1$ allows a large range of flight conditions to be considered despite the unity norm-bound constraint on $\delta_{\bar{q}}$. This weighting is incorporated into the stability analysis by scaling the feedback signals between the $\delta_{\bar{q}}$ operator and the plant P to form the scaled plant, $\bar{P}$.

$$\bar{P} = P \begin{bmatrix} W_{\bar{q}} & 0 \\ 0 & 1 \end{bmatrix} \quad (50)$$

A robust flutter margin is computed by analyzing $\mu(\bar{P})$ with respect to the $\bar{\Delta}$. The robust flutter pressure is determined by iterating over scalings $W_{\bar{q}}$ until the smallest pressure $\bar{q} = \bar{q}_0 = W_{\bar{q}}$ is found for which the $\bar{P}$ is robustly stable to the set of uncertainties $\Delta$. Theorem 4.4.3 formally demonstrates this concept.

Theorem 4.4.3: Given the plant P derived at nominal dynamic pressure $\bar{q}_0$ with a perturbation to dynamic pressure $\delta_{\bar{q}}$ and set of uncertainty operators $\Delta$ norm-bounded by one arranged in the feedback relationship of FIG. 9, define the plant $\bar{P}$ with real diagonal matrix $W_{\bar{q}}$ scaling the feedback signals relating $\delta_{\bar{q}}$ and P.

$$\bar{P} = P \begin{bmatrix} W_{\bar{q}} & 0 \\ 0 & 1 \end{bmatrix} \quad (51)$$

Then $\bar{q}_{flutter}^{rob} = \bar{q}_0 + W_{\bar{q}}$ is the robust flutter pressure if and only if $\mu(\bar{P}) = 1$. Also, $$\Gamma_{rob} = W_q \quad (52)$$

represents the least conservative robust flutter margin answering question 4.3.1.

Proof
←(necessary)

The condition $\mu(\bar{P}) = 1$ implies that the smallest destabilizing perturbation to $\bar{P}$ is described by some $\bar{\Delta} \in \bar{\Delta}$ with $\|\bar{\Delta}\|_\infty$, so no destabilizing $\Delta \in \Delta$ exists and the smallest positive destabilizing perturbation to dynamic pressure is at least $\delta_{\bar{q}} = 1$, which corresponds to dynamic pressure $\bar{q} = \bar{q}_0 + W_{\bar{q}}\delta_{\bar{q}} = \bar{q}_0 + W_{\bar{q}}$. Thus, $\bar{P}$ is guaranteed to be robustly stable to the uncertainty set $\Delta$ for any perturbation to dynamic pressure less than $W_{\bar{q}}$, to $W_{\bar{q}}$ is a robust flutter margin.

→(sufficient)

Assume $\mu(\bar{P}) > 1$. Define real, scaler $\alpha < 1$ such that $u(\bar{P}) = \alpha 1$, which implies, from theorem 3.3.2, that $\bar{P}$ is robustly stable to all uncertainties $\bar{\Delta} \delta \bar{\Delta}$ with $\|\bar{\Delta}\|_\infty < \alpha < 1$. Thus, $\bar{P}$ is not guaranteed to be stable over the entire range of modeling uncertainty defined by the unity norm-bounded set $\bar{\Delta}$, so this perturbation is not a valid robust flutter margin and does not answer question 4.3.1.

Assume $\mu \bar{P} < 1$. Define real, $\alpha > 1$ such that $u(\bar{P}) = \frac{1}{\alpha}$, which implies, from theorem 3.3.2, that $\bar{P}$ is robustly stable to all uncertainties $\bar{\Delta} \epsilon \bar{\Delta}$ with $\|\bar{\Delta}\|_\infty < \alpha$. Thus, $\bar{P}$ is robustly stable to an uncertainty description larger than that defined by the unity nonn-bounded set $\bar{\Delta}$, so this condition defines a valid flutter margin but is not the least conservative robust flutter margin and does not answer question 4.3.1.

The only difference between models $\bar{P}$ and P results from the scaling $W_{\bar{q}}$ which scales the feedback signals between $\bar{P}$ and $\delta_{\bar{q}}$. No external scaling matrix is allowed to affect the feedback signals between $\bar{P}$ and $\Delta$ because $\Delta$ is defined with a unity norm bound. Computing $\mu$ of the plant $\bar{P}$ with an additional scaling on the lower-loop signals would consider a scaled set of operators $\Delta$ that does not accurately represent the uncertainty description. Therefore, $\bar{P}$ only scales the $\delta_{\bar{q}}$ feedback signals.

Theorem 4.4.3 can be modified to compute a nominal flutter margin by changing the identity matrix in the scaling used to compute $\bar{P}$ to a zero matrix. This modification eliminates the feedback interconnection between the model and the uncertainty description $\Delta$, so $\mu$ considers only the nominal dynamics and computes the smallest destabilizing perturbation to dynamic pressure and $\Gamma_{rob}\Gamma_{nom}$.

Including the uncertainty description $\Delta$ ensures the robust flutter margin will be no greater than the nominal flutter margin. The robust flutter margin considers the model used to compute the nominal flutter margin that corresponds to the uncertainty operator $\Delta = 0 \epsilon \Delta$ and the models that correspond to the remaining operators $\Delta \epsilon \Delta$. The conservatism in the robust flutter margin makes intuitive sense because the nominal flutter margin is the worst-case stability boundary for a single model and the robust flutter margin is the worst-case stability boundary for a family of models.

$$\Gamma_{rob} \leq \Gamma_{nom} \quad (53)$$

The proof demonstrating the necessary and sufficient condition $\mu(\bar{P}) = 1$ also makes intuitive sense because the equality sign is needed to ensure the flutter margin is valid without being overly conservative. If $\mu(\bar{P}) < 1$, then no $\Delta \epsilon \Delta$ causes an instability and the flutter margin is too conservative. If $\mu(\bar{P}) < 1$, then the system is not robust to all modeling errors $\Delta \epsilon \Delta$ and the flutter margin is not a valid robust flutter margin.

Theorem 4.4.3 demonstrates a robust flutter margin can be computed by determining a scaling matrix $W_{\bar{q}}$ for which $\mu(\bar{P}) = 1$. Algorithm 4.4.4 implements an iterative approach to compute a scaling matrix for which $\mu(\bar{P}) \epsilon (1 \pm \epsilon)$ for some desired level of accuracy $\epsilon$.

Algorithm 4.4.4 (robust flutter margin):

Given plant P at nominal dynamic pressure $\bar{q}_0$ affected by unity norm-bounded $\delta_{\bar{q}}$ and $\Delta$ as in FIG. 9:

Define initial weighting $W_{\bar{q}}$.

Define scalar $\epsilon>0$ for accuracy.

$$\overline{P} = P \begin{bmatrix} W_{\overline{q}} & 0 \\ 0 & 1 \end{bmatrix}$$

while $(\mu(\overline{P}) > 1+\epsilon)$ OR $(\mu(\overline{P}) < 1-\epsilon)\{$ $$W_{\overline{q}} = \frac{W_{\overline{q}}}{\mu(\overline{P})}$$

$$\overline{P} = P \begin{bmatrix} W_{\overline{q}} & 0 \\ 0 & 1 \end{bmatrix}$$

$$\overline{q}_{flutter}^{rob} = \overline{q}_0 + W_{\overline{q}}$$

$$\Gamma_{rob} = W_{\overline{q}}$$

The dynamic pressure $\overline{q}_0$ defining the flight condition for the nominal plant dynamics must be chosen carefully to ensure the robust flutter margin computed with algorithm 4.4.4 is valid. The nature of $\mu$ and the upper bound is such that all norm-bounded operators centered around the origin are assumed to be valid perturbations to the plant dynamics, so positive and negative perturbations to dynamic pressure are considered by the robust stability analysis. Thus, the robust flutter margin computed by $\mu(\overline{P})=1$ could correspond to either perturbation $\delta_{\overline{q}}=1$ or $\delta_{\overline{q}}=-1$.

The actual dynamic pressure at the flutter instability is occurs at a negative dynamic pressure that may be unrealistic for classical flutter analysis. The value of the nominal dynamic pressure $\overline{q}_0$ can slide along the real axis to a large value without loss of generality in the $\mu$ analysis because this parameter linearly affects the nominal dynamics. A simple approach to ensure that the robust flutter pressure is a positive dynamic pressure is demonstrated in algorithm 4.4.5, which iterates over increasing values of $\overline{q}_0$ until the scaling associated with the robust flutter margin satisfies $W_{\overline{q}} < \overline{q}_0$.

Algorithm 4.4.5 (robust flutter margin with $\overline{q}_0$ iteration):
Given parameters as in algorithm 4.4.4:
Given initial value of nominal dynamic pressure $\overline{q}_0$:

valid_margin = FALSE while(valid_margin == FALSE) { compute plant P at nominal dynamic pressure $\overline{q}_0$ compute $\overline{q}_{flutter}^{rob}$ and associated $W_{\overline{q}}$ from algorithm 4.4.4 if $(W_{\overline{q}} > \overline{q}_0)$, then $\overline{q}_0 = 1.1W_{\overline{q}}$
   else      valid_margin = TRUE

}

The exclusion of low and negative dynamic pressures for stability analysis may not be desirable for all applications related to aeroelasticity. An example of such an application is the analysis of aeroservoelastic dynamics for a high-angle-of-attack aircraft that concerns instabilities at low dynamic pressures. The procedure for these types of analysis chooses a low value of $\overline{q}_0$ and finds the scaling $W_{\overline{q}}$ corresponding to $\delta_{\overline{q}}=-1$, which computes the low dynamic pressure instability. Algorithm 4.4.5 can be modified for these applications.

The flutter margin computation must allow for an arbitrary structure of operators $\overline{\Delta}$, so an upper bound such as the function derived in appendix A must be used. Algorithms 4.4.4 and 4.4.5 can be adapted by replacing the $\mu$ calculation with a $\mu$ upper-bound calculation to compute flutter margins. A search over frequency points is required when using the upper bound (appendix A), so the accuracy of the robust flutter margin requires a dense grid of frequencies associated with the natural frequencies of the worst-case dynamics to be considered.

A simple approach can be implemented if the natural frequency of the unstable dynamics at the nominal flutter pressure can be assumed to be similar to the natural frequency of the unstable dynamics at the robust flutter pressure. This assumption can be justified if the uncertainty does not change the critical flutter mode between the nominal and robust flutter pressures, which is often true for systems that have relatively small levels of uncertainty and clear separation between critical and subcritical modal frequencies. Algorithm 4.4.6 presents this approach, which first computes the frequency of the nominal flutter mode and then computes a robust flutter margin from the $\mu$ upper bound evaluated near that frequency.

Algorithm 4.4.6 (robust flutter margin with reduced frequency grid):
Given the system in FIG. 9:
Compute frequency $\omega$ associated with nominal flutter dynamics using algorithm 4.4.2.
Define dense frequency grid $\Omega$ centered around $\omega$.
Compute robust flutter maring from $\mu$ upper bound evaluated at $\Omega$ using algorithm 4.4.5.

A large and dense frequency grid increases the confidence that computed robustness measure is actually an upper bound for $\mu$. Algorithm 4.4.6 must be used with caution because the assumptions behind its use may not be satisfied. Computing a robust flutter margin with a dense frequency grid for a particular aircraft at several Mach numbers and then comparing the frequencies of the flutter dynamics to those of the nominal flutter dynamics is recommended. If these frequencies are similar, then algorithm 4.4.6 can be considered for further analysis at different Mach numbers.

4.5 Properties of the Structured Singular Value as a Flutter Margin

The flutter computation method described herein uses $\mu$ as the worst-case flutter parameter. The structured singular value is a much more informative flutter margin than traditional parameters such as pole location and modal damping, so $\mu$ presents several advantages as a flutter parameter.

The conservatism introduced by considering the worst-case uncertainty perturbation can be interpreted as a measure of sensitivity. Robust $\mu$ values that are significantly different than the nominal flutter margins indicate the plant is highly sensitive to modeling errors and changes in flight condition. A small perturbation to the system can drastically alter the flutter stability properties. Conversely, similarity between the robust and nominal flutter margins indicates the aircraft is not highly sensitive to small perturbations.

Robustness analysis determines not only the norm of the smallest destabilizing perturbation but also the direction. This information relates exact perturbations for which the system is particularly sensitive. Thus, $\mu$ can indicate the worst-cast flutter mechanism, which may naturally extend to indicate active and passive control strategies for flutter suppression.

Damping is only truly informative at the point of instability because stable damping at a given condition does not necessarily indicate an increase in dynamic pressure will be a stable flight condition. The structured singular value computes the smallest destabilizing perturbation, which indicates the nearest flight conditions that will cause a flutter instability. In this respect, $\mu$ is a stability predictor and damping is merely a stability indicator.

These characteristics of $\mu$ make the worst-case flutter algorithm especially valuable for flight test programs. Aeroelastic flight data can be measured at a stable flight condition and used to evaluate uncertainty operators. Unlike damping estimation, the $\mu$ method does not require the aircraft to approach instability for accurate prediction. The $\mu$ can be computed to update the stability margins with respect to the new uncertainty levels. The worst-case stability margin then indicates what flight conditions can be safely considered.

Safe and efficient expansion of the flight envelope can be performed using an on-line implementation of the worst-case stability estimation algorithm. Computing $\mu$ does not introduce an excessive computational burden because each F/A-18 flutter margin presented herein was derived in less than 2 min using standard off-the-shelf hardware and software packages. The predictive nature of $\mu$ and the computational efficiency allow a flutterometer tool to be developed that tracks the flutter margin during a flight test.

5. UNCERTAINTY DESCRIPTIONS IN AEROELASTIC MODELS

Parametric Uncertainty in Structural Models

Parametric uncertainty denotes operators that describe errors and unmodeled variations in specific elements and coefficients in dynamic system equations. Recall the generalized aeroelastic equation of motion for state vector $\eta \in R^2$.

$$M[|\$]\$``g\ddot{\eta}+C\dot{\eta}+\tilde{K}\eta+\bar{q}Q(s)\eta=0 \quad (54)$$

Robust flutter margins computed with the $\mu$ method are strongly affected by the choice of uncertainty descriptions associated with these dynamics, so this uncertainty must be a reasonable indicator of potential modeling errors. Parametric uncertainty can be directly associated with the structural matrices to indicate specific errors in the finite-element model.

Define an operator, $\Delta_K \in R^{n \times n}$ that describes additive uncertainty of a nominal stiffness matrix $K_0$. Associate a weighting matrix, $W_K \in R^{n \times n}$ with this uncertainty such that a stability analysis should consider a range of stiffness matrices described by all $\Delta_k$ with $\|\Delta_C\|_\infty \leq 1$.

$$K=K_0+W_K\Delta_K \quad (55)$$

Parametric uncertainty can also be associated with structural elements in a multiplicative relationship. Define an operator, $\Delta_C \in R^{n \times n}$ that describes multiplicative uncertainty of the nominal damping matrix $C_0$. A weighting $W_C \in R^{n \times n}$ is again associated with the uncertainty such that the anticipated range of damping matrices for robust stability analysis is described by all $\Delta C$ with $\|\Delta_C\|_\infty \leq 1$.

$$C=C_0(I+W_C\Delta_C) \quad (56)$$

The choice of additive uncertainty for $\Delta_k$ and multiplicative uncertainty for $\Delta_C$ does not reflect any generalized assumptions regarding the proper way to model errors in stiffness and damping; rather, each type is included to demonstrate the different mathematical derivations. Additive and multiplicative operators are common types of uncertainty models, so demonstrating how these types of uncertainty are associated with a structural model is instructive. The actual choice of $\Delta_k$ and $\Delta_c$ is problem-dependent and can vary with different aircraft and different finite-element modeling procedures.

The uncertainty operators are described in this section as $\Delta_K, \Delta_C \in R^{n \times n}$ with real elements because the operators describe perturbations to the generalized stiffness and damping matrices that are usually real. These operators are often additionally constrained to be diagonal operators with n independent parameters because the generalized stiffness and damping are often computed as real diagonal matrices. The real and diagonal nature of these uncertainties is not required for $\mu$ analysis, so full-block complex uncertainties can be used if they better describe the nature of the modeling errors.

Also, the weighting functions $W_K, W_C \in R^{n \times n}$ are presented as constant and real matrices because the functions are associated with constant and real stiffness and damping matrices. These constraints on the nominal plant through a feedback relationship. The feedback operation w is a linear combination of the states of the plant. The weightings can be relaxed if the nature of the uncertainty is best described by complex and frequency varying weighting functions.

Substitute the uncertain K and C into the equation of motion, including the state-space representation of the unsteady aerodynamic forces Q(s) presented in section 4.1. Introduce a perturbation, $\delta_q$, to dynamic pressure, and separate the nominal dynamics from the unknown terms.

$$0=M[|\$]\$``g\ddot{\eta}+C\dot{\eta}(K+\bar{q}D_Q)\eta+\bar{q}C_Q x$$

$$=M\eta+C_o(I+W_C\Delta_C)\dot{\eta}+(K_o+W_K\Delta_K+(\bar{q}_o+\delta_q)D_Q)\eta+(\bar{q}_o+\delta_q)C_Q X$$

$$=\eta+[M^{-1}C_o\dot{\eta}+M^{-1}(K_o+\bar{q}_oD_Q)\eta+\bar{q}_oM^{-1}C_Q x]$$

$$+\delta_q[M^{-1}D_Q\eta+M^{-1}C_Q x]+\Delta_K[M^{-1}W_K\eta]+\Delta_C[M^{-1}C_oW_C\dot{\eta}]$$

$$=\eta+[M^{-1}C_o\dot{\eta}+M^{-1}(K_o+\bar{q}_oD_Q)\eta+\bar{q}_oM^{-1}C_Q x]+\delta_q z_q+\Delta_K z_K+\Delta_C z_C$$

$$=\eta+[M^{-1}C_o\dot{\eta}+M^{-1}(K_o+\bar{q}_oD_Q)\eta+\bar{q}_oM^{-1}C_Q x]+w_q+w_K+w_C \quad (57)$$

The signals $z_{\bar{q}}$ and $w_{\bar{q}}$ are introduced in section 4.2 to relate the perturbation in dynamic pressure to the nominal plant through a feedback relationship. The feedback operation $w_{\bar{q}}=\delta_{\bar{q}} z_{\bar{q}}$ is used where $z_{\bar{q}}$ is a linear combination of the states of the plant.

$$z_q=M^{-1}D_Q\eta+M^{-1}C_Q x \quad (58)$$

Additional signals are introduced to the plant formulation, where $z_K$ and $w_K$ are associated with the uncertainty in the stiffness matrix, and $z_C$ and $w_C$ are associated with the uncertainty in the damping matrix. The outputs of the plant $z_K$ and $z_C$ are formulated as linear combinations of the states.

$$z_K=M^{-1}W_K\eta$$

$$z_C=M^{-1}W_CC_0\eta \quad (59)$$

The feedback mechanism to describe the modeling uncertainty uses a relationship between these output signals and the $w_K$ and $w_C$ input signals.

$$W_K=\Delta_K z_K$$

$$W_C=\Delta_C z_C \quad (60)$$

The state-space plant matrix can be formulated using these additional input and output signals.

$$\begin{bmatrix} \dot{\eta} \\ \ddot{\eta} \\ \dot{x} \\ \hline \dot{z}_{\bar{q}} \\ z_K \\ z_C \end{bmatrix} = \begin{bmatrix} 0 & I & 0 & | & 0 & 0 & 0 \\ -M^{-1}(K_0 + \bar{q}_o D_Q) & -M^{-1}C & -\bar{q}M^{-1}C_Q & | & -I & -I & -I \\ B_Q & 0 & A_Q & | & 0 & 0 & 0 \\ \hline M^{-1}D_Q & 0 & M^{-1}C_Q & | & 0 & 0 & 0 \\ M^{-1}W_K & 0 & 0 & | & 0 & 0 & 0 \\ 0 & M^{-1}C_0 W_C & 0 & | & 0 & 0 & 0 \end{bmatrix} \begin{bmatrix} \eta \\ \dot{\eta} \\ x \\ \hline w_{\bar{q}} \\ w_K \\ w_C \end{bmatrix} \quad (61)$$

Figure 10:
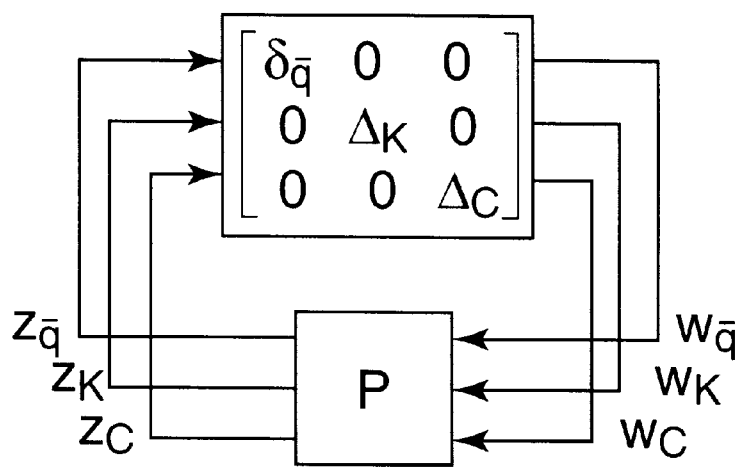
FIG. 10 illustrates a linear fractional transformation system for robust stability analysis in the $\mu$ framework with parameterization around perturbation in dynamic pressure and uncertainty in structural stiffness and damping matrices.

FIG. 10 shows how the uncertainty operators and perturbation to dynamic pressure affect this plant formulation in a feedback manner The formulation does not directly allow uncertainty in mass to be described by a feedback operator. The LFT and $\mu$ frameworks require uncertainty operators to affect the nominal dynamics in a linear manner, and this requirement precludes introducing mass uncertainty. The inverse of the mass matrix scales most terms in the state matrix of P(s), including terms involving $\bar{q}$. Associating a mass uncertainty operator $\Delta_M$ with the mass matrix scaling $\bar{q}$ would introduce terms of $\Delta_M \delta_{\bar{q}}$, which is a nonlinear function of uncertainty operators and cannot be directly considered by the $\mu$ method.

Parametric Uncertainty in Aerodynamic Models

The unsteady aerodynamic forces $Q(s) \in C^{n \times n}$ can be represented as a state-space model with $n_Q$ states.

$$Q(s) = D_Q + C_Q(sI - A_q)^{-1} B_Q \quad (62)$$

Parametric uncertainty can be associated with the matrix elements of this state-space representation to describe errors. These errors can result from several sources in the modeling procedure, including computational fluid dynamic algorithms that determine the frequency-varying forces and the system identification algorithms that represent the computational values as a state-space system.

Define an operator $\Delta_{A_Q} \in R^{n_Q \times n_Q}$ to describe uncertainty in the state matrix of $Q(s)$. This operator directly affects a nominal $A_{Q_0}$ and describes errors and variations in the poles of the state-space representation of the unsteady aerodynamic forces. Include a weighting function $W_{A_Q} \in R^{n \times n}$ such that the range of state matrices to be considered by robust stability analysis is described by all $\Delta_{A_Q}$ with $\|\Delta_{A_Q}\|_\infty \leq 1$.

$$A_Q = A_{Q_0} + W_{A_Q} \Delta_{A_Q} \quad (63)$$

Define also an operator $\Delta_{B_Q} \in R^{n_Q \times n}$ to describe multiplicative uncertainty in a nominal $B_{Q_0}$ matrix of $Q(s)$. A weighting function $W_{B_Q} \in R^{n_Q \times n}$ is associated with this uncertainty such that the range of possible $B_Q$ matrices is described by all with $\|\Delta_{A_Q}\|_\infty \leq 1$.

$$B_Q = B_{Q_0}(I + W_{B_Q} \Delta_{B_Q}) \quad (64)$$

The choice of additive and multiplicative operators is made for reasons similar to those presented above in the first subsection of this section 5. One of each type of uncertainty is included to demonstrate the derivation procedures of how each uncertainty is associated with the nominal aeroelastic dynamics in a feedback relationship. The actual choice of which type of uncertainty is most suitable to describe errors in $A_Q$ and $B_Q$ is problem-dependent.

Also, defining the uncertainty operators as real and weightings that are real and constant is not a requirement. This section presents the problem formulation with these definitions because associating these types of uncertainties and weightings with the constant real $A_Q$ and $B_Q$ matrices makes intuitive sense. Certainly $\mu$ can also compute robust flutter margins with respect to complex frequency-varying weighted uncertainties.

The nominal aeroelastic model in section 4.2 defined the vector x as the states associated with the state-space model $Q(s)$. The matrices $A_Q$ and $B_Q$ directly affect the aeroelastic dynamics only through the state derivative equation for x and do not appear in the other state derivative equations. The aeroelastic plant can be formulated in the $\mu$ framework by substituting the uncertain values of $A_Q$ and $B_Q$ into this state derivative equation without considering changes in the derivative equations for the remaining states $\eta$ and $\dot{\eta}$ $$\dot{x} = A_Q x + B_Q \eta$$
$$= (A_{Q_0} + W_{A_Q} \Delta_{A_Q}) x + B_{Q_0}(I + W_{B_Q} \Delta_{B_Q}) \eta$$
$$= A_{Q_0} x + B_{Q_0} \eta + \Delta_{A_Q} W_{A_Q} x + \Delta_{B_Q} W_{B_Q} B_{Q_0} \eta$$
$$= A_{Q_0} x + B_{Q_0} \eta + \Delta_{A_Q} z_{A_Q} + \Delta_{B_Q} z_{B_Q}$$
$$= A_{Q_0} x + B_{Q_0} \eta + w_{A_Q} + w_{B_Q}$$

Several signals are introduced to this equation, where $z_{A_Q}$ and $w_{A_Q}$ are associated with the uncertainty in $A_Q$ and $z_{B_Q}$, and $w_{B_Q}$ is associated with the uncertainty in $B_Q$. The signals $z_{A_Q}$ and $z_{B_Q}$ are output from the plant matrix as linear combination of the states.

$$z_{A_Q} = W_{A_Q} x$$
$$z_{B_Q} = W_{B_Q} B_{Q_0} \eta \quad (66)$$

The feedback mechanism to describe the modeling uncertainty uses a relationship between these output signals and the $w_K$ and $w_C$ input signals.

$$w_{A_Q} = \Delta_{A_Q} z_{A_Q}$$
$$w_{B_Q} = \Delta_{B_Q} z_{B_Q} \quad (67)$$

The state-space plant matrix can be formulated using these additional input and output signals.

$$\begin{bmatrix} \dot{\eta} \\ \ddot{\eta} \\ \dot{x} \\ \hline z_{\bar{q}} \\ z_{A_Q} \\ z_{B_Q} \end{bmatrix} = \begin{bmatrix} 0 & I & 0 & \vline & 0 & 0 & 0 \\ -M^{-1}(K_0 + \bar{q}_o D_Q) & -M^{-1}C_0 & -\bar{q}M^{-1}C_Q & \vline & -I & 0 & 0 \\ B_{Q_0} & 0 & A_{Q_0} & \vline & 0 & I & I \\ \hline M^{-1}D_Q & 0 & M^{-1}C_Q & \vline & 0 & 0 & 0 \\ 0 & 0 & W_{A_Q} & \vline & 0 & 0 & 0 \\ W_{B_Q}B_{Q_0} & 0 & 0 & \vline & 0 & 0 & 0 \end{bmatrix} \begin{bmatrix} \eta \\ \dot{\eta} \\ x \\ \hline w_{\bar{q}} \\ w_{A_Q} \\ w_{B_Q} \end{bmatrix} \quad (68)$$

Figure 11:
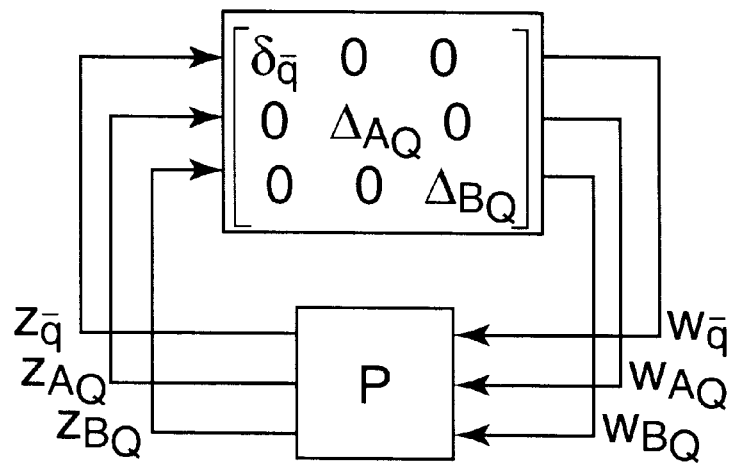
FIG. 11 illustrates a linear fractional transformation system for robust stability analysis in the $\mu$ framework with parameterization around perturbuation in dynamic pressure and uncertainty in $A_Q$ and $B_Q$ matrices of the state-space $Q(s)$ model.
Figure 12:
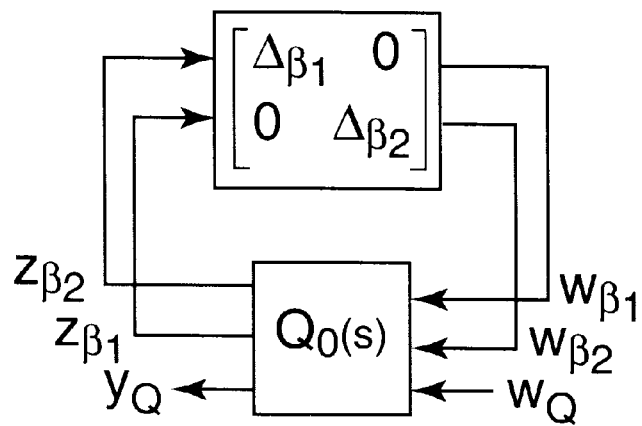
FIG. 12 illustrates a linear fractional transformation system describing Padé approximation to represent unsteady aerodynamic force matrix in the $\mu$ framework with uncertainty in lag terms.

FIG. 11 shows how the uncertainty operator and perturbation to dynamic pressure affect this plant formulation in a feedback manner.

Associating a $\Delta_{B_Q}$ uncertainty operator with the $B_Q$ matrix may not seem immediately useful because considering errors in the poles determined by the $A_Q$ matrix is often intuited. This $\Delta_{B_Q}$ uncertainty can be essential to accurately describe the modeling errors because errors in terms common to both $A_Q$ and $B_Q$ may exist. Such a situation arises for certain modeling representations of aerodynamic lags. Consider a simplified Roger's form Q(s) matrix that uses two Padé approximations to represent lag terms.

$$Q(s) = \frac{s}{s+\beta_1} + \frac{s}{s+\beta_2} = \begin{bmatrix} -\beta_1 & 0 & \vline & -\beta_1 \\ 0 & -\beta_2 & \vline & -\beta_2 \\ \hline 1 & 1 & \vline & 2 \end{bmatrix} \quad (69)$$

The poles of this system are determined entirely by the $A_Q$ matrix, so uncertainty in the poles can be entirely described by a $\Delta_{A_Q}$ operator associated with the $A_Q$ matrix. A similar uncertainty $\Delta_{B_Q}$ should also be associated with the $B_Q$ matrix in this case because the $\beta_1$, and $\beta_2$ terms appear in both $A_Q$ and $B_Q$. Allowing variation in $A_Q$ but not in $B_Q$ will introduce unwanted zeros to the system, so the proper way to model pole uncertainty for this formulation is to include both $\Delta_{A_Q}$ and $\Delta_{B_Q}$ operators.

The Padé approximation appears often in aeroelastic models, so demonstrating the LFT formulation of Q(s), which includes the uncertainties in poles $\beta_1$ and $\beta_2$ in a feedback relationship, may be useful. The uncertainties in Q(s) can be developed distinctly from the structural uncertainties because LFT operations allow the structural and aerodynamic models to be combined into a single plant model with a structured uncertainty description.

Define real scalar operators $\Delta_{B_1}$ and $\Delta_{B_2}$ to describe uncertainty associated with nominal values of the poles $\beta_{1_0}$ and $\beta_{2_0}$. Real scalar weightings $W_{\beta_1}$ and $W_{\beta_2}$ normalize the uncertainty such that the range of poles to be considered by robust stability analysis is described by all $\Delta_{B_1}$ with $\|\Delta_{B_1}\|_\infty \leq 1$ and all $\Delta_{B_2}$ with $\|\Delta_{B_2}\|_\infty \leq 1$.

$$\beta_1 = \beta_{1_0} + W_{\beta_1}\Delta_{\beta_1}$$

$$\beta_2 = \beta_{2_0} + W_{\beta_2}\Delta_{\beta_2} \quad (70)$$

Define states $x_1$ and $x_2$ of Q(s), and consider an input signal $u_Q$ that generates the output signal $y_Q$ by the relationship $y_Q = Qu_Q$. Substitute the uncertain $\beta_1$ into the state equation of $x_1$.

$$\dot{x}_1 = -\beta_1 x_1 - \beta_1 u_Q$$

$$= -(\beta_{1_0} + W_{\beta_1}\Delta_{\beta_1})x_1 - (\beta_{1_0} + W_{\beta_1}\Delta_{\beta_1})u_Q$$

$$= -\beta_{1_0}x_1 - \beta_{1_0}u_Q - \Delta_{\beta_1}(W_{\beta_1}x_1 + W_{\beta_1}u_Q)$$

$$= -\beta_{1_0}x_1 - \beta_{1_0}u_Q - \Delta_{\beta_1}z_{\beta_1}$$

$$= -\beta_{1_0}x_1 - \beta_{1_0}u_Q - w_{\beta_1} \quad (71)$$

Perform a similar derivation for the state equation of $x_2$, $$\dot{x}_2 = -\beta_2 x_2 - \beta_2 u_Q$$

$$= -(\beta_{2_0} + W_{\beta_2}\Delta_{\beta_2})x_2 - (\beta_{2_0} + W_{\beta_2}\Delta_{\beta_2})u_Q$$

$$= -\beta_{2_0}x_2 - \beta_{2_0}u_Q - \Delta_{\beta_2}(W_{\beta_2}x_2 + W_{\beta_2}u_Q)$$

$$= -\beta_{2_0}x_2 - \beta_{2_0}u_Q - \Delta_{\beta_2}z_{\beta_2}$$

$$= -\beta_{2_0}x_2 - \beta_{2_0}u_Q - w_{\beta_2} \quad (71)$$

The signals $z_{\beta_1}$ and $w_{\beta_1}$ are introduced as plant output and input signals to relate the uncertainty $\Delta_{B_1}$ in a feedback manner. The signals $z_{\beta_2}$ and $w_{\beta_2}$ are similarly introduced to relate the uncertainty $\Delta_{B_2}$ in a feedback manner. The state-space matrix can be formulated to describe the nominal $Q_0(s)$ with these additional input and output signals.

$$\begin{bmatrix} \dot{x}_1 \\ \dot{x}_2 \\ \hline z_{\beta_1} \\ z_{\beta_2} \\ y_Q \end{bmatrix} = \begin{bmatrix} -\beta_{1_o} & 0 & \vline & -1 & 0 & -\beta_{1_o} \\ 0 & -\beta_{2_o} & \vline & 0 & -1 & -\beta_{2_o} \\ \hline W_{\beta_1} & 0 & \vline & 0 & 0 & W_{\beta_1} \\ 0 & W_{\beta_2} & \vline & 0 & 0 & W_{\beta_2} \\ 1 & 1 & \vline & 0 & 0 & 2 \end{bmatrix} \begin{bmatrix} x_1 \\ x_2 \\ \hline w_{\beta_1} \\ w_{\beta_2} \\ u_Q \end{bmatrix} \quad (73)$$

Dynamic Uncertainty

Dynamic uncertainty operators are often associated with aeroelastic models to account for modeling errors that are not efficiently described by parametric uncertainty. Unmodeled dynamics and inaccurate mode shapes are examples of modeling errors that can be described with less conservatism by dynamic uncertainties than with parametric uncertainties. These dynamic uncertainties are typically complex in order to represent errors in both magnitude and phase of signals.

Consider a system P having two modes with natural frequencies at 4 rad/sec and 30 rad/sec.

$$P = \left(\frac{16}{s^2 + 0.4s + 16}\right)\left(\frac{900}{s^2 + 0.6 + 900}\right) \quad (74)$$

Define a nominal model $P_0$, which will be used for stability analysis of the system but does not model the high-frequency mode of P.

$$P = \left(\frac{16}{s^2 + 0.4s + 16}\right) \quad (75)$$

The large difference in natural frequency between the high- and low-frequency modes of P precludes parametric uncertainty associated with the low-frequency mode of $P_0$ from being a reasonable description of the modeling errors in $P_0$. The magnitude of any parametric uncertainty associated with the low-frequency mode would need to be extremely large to account for the unmodeled high-frequency dynamics, so the stability analysis would be relatively meaningless because the large uncertainty would imply the plant is not accurate at any frequencies.

A multiplicative uncertainty operator $\Delta \in C$, can be used to describe the high-frequency modeling error without introducing the excessive conservatism resulting from a parametric uncertainty description. Associate a complex, scalar, weighting function $W(s) \in C$ with this uncertainty to reflect the frequencyvarying levels of modeling errors.

$$W = 100 \frac{s+0.5}{s+500} \tag{76}$$

The set of plants $\mathcal{P}$ used for robust stability analysis is formulated to account for the range of dynamics as described by the norm-bounded multiplicative uncertainty $\Delta$.

$$\mathcal{P} = \{P_0(I+W\Delta) : \|\Delta\|_\infty \leq 1\} \tag{77}$$

Figure 13:
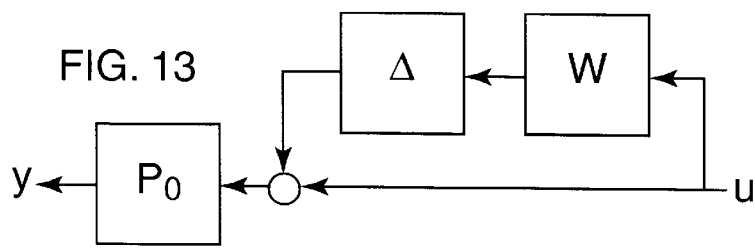
FIG. 13 illustrates a family of plants $P=P_0(I+\Delta W)$ with input multiplicative uncertainty.
Figure 14:
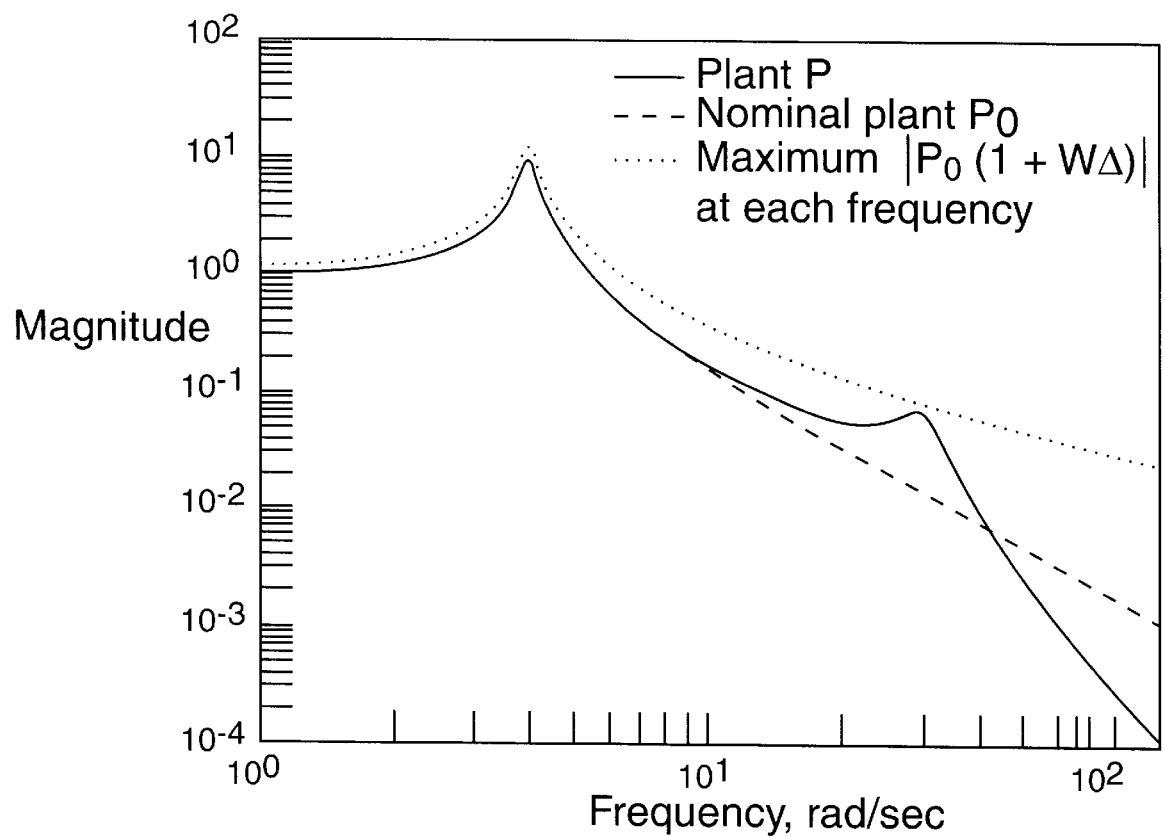
FIG. 14 illustrates transfer functions for example system with multiplicative uncertainty.

FIG. 13 shows the block diagram for robust stability analysis of $\mathcal{P}$ and FIG. 14 shows the magnitude of the transfer function from input to output for P and $P_0$, and the maximum of $[P_0(I+W)]$ which is an upper bound for the output of P at each frequency. The multiplicative uncertainty is able to bound the modeling error at the frequency mode without introducing excessive conservatism from large uncertainty associated with the low frequency mode.

Dynamic additive operators may also be required in the uncertainty description to account for errors that are not efficiently described by either multiplicative and parametric uncertainties. Modeling errors associated with a zero of the system dynamics are an example of an error that is best described by additive uncertainty. Multiplicative operators are not useful in this case because $P_0(j\omega)=0$ at the frequency $\omega$ associated with the zero of nominal model and, correspondingly, every member of the set of plants $P_0(j\omega)$ $(I+W\Delta)=0$ at this frequency. Additive uncertainty allows the system output for some member of the set of plants to be nonzero even at frequencies of the zeros of the nominal plant.

Consider a plant P with several poles and zeros.

$$P = \frac{16}{64}\left(\frac{s^2+0.48s+64}{s^2+0.48s+16}\right)\left(\frac{900}{s^2+0.6s+900}\right) \tag{78}$$

Assume the nominal plant $P_0$ of this plant is similar to P and has the correct number of poles and zeros, but the coefficients of the system equations are incorrect.

$$P_0 = \frac{16}{36}\left(\frac{s^2+0.36s+36}{0s^2+0.4s+16}\right)\left(\frac{900}{s^2+0.6s+900}\right) \tag{79}$$

Define an additive uncertainty operator $\Delta \in C$ that is normalized by a complex, scalar function W to reflect the frequency-varying levels of the modeling errors.

$$W = 0.1\frac{s+50}{s+5} \tag{80}$$

The set of plants $\mathcal{P}$ used for robust stability analysis is formulated to account for the range of dynamics as described by the norm-bounded additive uncertainty $\Delta$.

$$\mathcal{P} = \{P_0 + W\Delta : \|\Delta\|_\infty \leq 1\} \tag{81}$$

Figure 15:
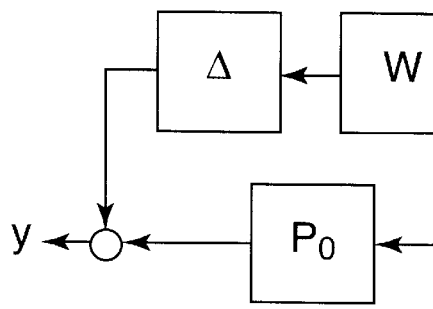
FIG. 15 illustrates a family of plants $P=P_0+W\Delta$ with additive uncertainty.

FIG. 15 shows the block diagram for robust stability analysis of $\mathcal{P}$.

Figure 16:
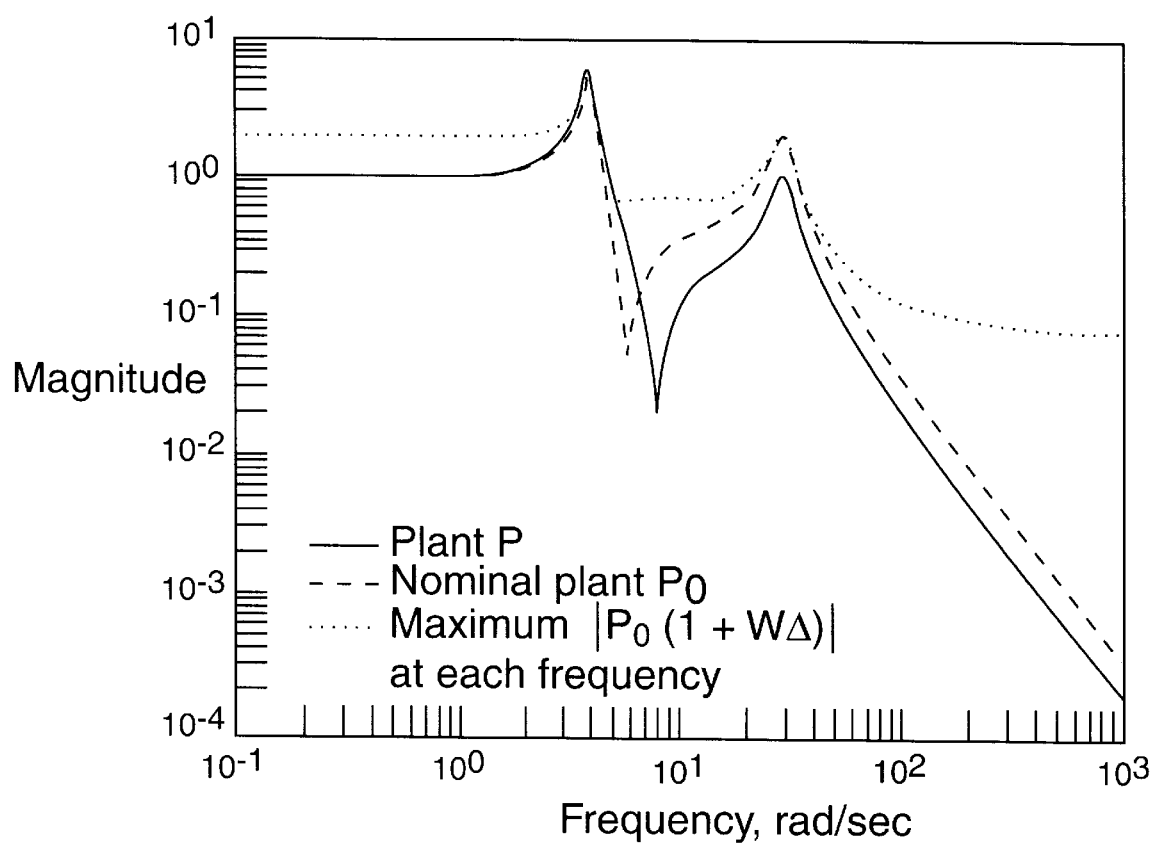
FIG. 16 illustrates transfer functions for example system with additive uncertainty.

FIG. 16 shows the magnitude of the transfer function from input to output for P and $P_0$, and the maximum magnitude of $|P_0+W\Delta|$ at each frequency. The additive uncertainty bounds the modeling error at each frequency, including the frequencies near the zero of the nominal plant, because the output of P is bounded above by the maximum magnitude of the members of the set $\mathcal{P}$.

These multiplicative and additive uncertainties are particularly important when comparing an analytical transfer function with experimental transfer functions derived from flight data. Analytical models are often computed for a low range of frequencies because the high frequencies add complexity to the model but do not always affect the stability margins of the aircraft. The experimental data may indicate a high frequency mode that is not included in the analytical model, so a frequency-weighted dynamic multiplicative uncertainty can be associated with the model.

The issue of mode shape uncertainty is often encountered when comparing low-frequency-predicted dynamical responses with flight data because sensor measurements are directly affected by the mode shapes. Both multiplicative and additive uncertainties may be required to accurately model mode shape errors and account for inaccurate response levels (which may be higher than predicted at some frequencies but lower than predicted at others) and inaccurate frequencies associated with poles and zeros.

Uncertainty Associated with Nonlinearities

The $\mu$ framework described uses linear operators to represent dynamical models and associated uncertainties but does not admit nonlinear operators. The [t framework is useful for analyzing aircraft stability despite the constraints of linearity because physical systems, which are always nonlinear, can often be approximated by linear models to a high degree of accuracy. A classic example of this situation notes the linearized dynamics are often an acceptable representation of an aircraft operating near trim flight conditions, so linear models work well in practice for control synthesis and stability analysis.

Nonlinear dynamics cannot always be accurately described by a linearized dynamics model, so the stability analysis should consider the effects of these nonlinearities. The $\mu$ framework can associate linear uncertainty operators with linear models to describe the errors resulting from some types of unmodeled nonlinear dynamics. The uncertainty does not actually represent the nonlinearity; rather, the uncertainty allows the linear system responses to vary with sufficient magnitude to bound a range of nonlinear system responses.

Figure 17:
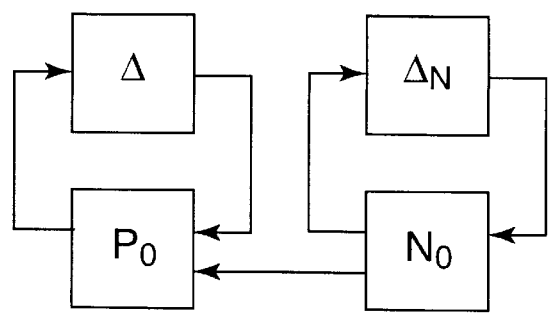
FIG. 17 illustrates linear fractional transformation system with nominal models and associates uncertainty operators.

Separating the nonlinear dynamics that cannot be linearized from the nonlinear dynamics that can be accurately represented by linear models is useful. Separate uncertainty descriptions can be formulated for each dynamical block, and the resulting operators can be combined using the LFT framework to formulate a single, linear, plant model with a structured uncertainty description. FIG. 17 shows an example LFT system representation for a nominal plant $P_0$ and associated uncertainty $\Delta$, and a nominal linear model $N_0$ and associated uncertainty $\Delta_N$ representing a system element with nonlinear dynamics.

The system shown in FIG. 17 is commonly used to describe the coupling between the aeroelastic dynamics and actuators affecting an aircraft through control surfaces. Actuators can display many types of nonlinear behaviors and should be considered in the aeroelastic stability analysis, because pilot and autopilot commands that maintain trim during flight ensure the control surfaces are continuously moving. The errors in linear models resulting from unmodeled actuator dynamics such as nonlinear stiffness parameters or hysteresis functions can sometimes be described by a linear uncertainty operator.

Consider the response y of a nonlinear system N that models a system that has a nonlinear stiffness corresponding to a hardening spring that is valid for the bounded input signal u ∈ [−10, 10]. Such a system can represent an element of an actuator model or a nonlinear structural model.

$$y=Nu=2u+0.02u^2+0.0082u^3 \tag{82}$$

Define a linear nominal model $N_0$ such that $y=N_0$ u approximates the response of N.

$$N_0=2 \tag{83}$$

Associate an additive weighting operator $\Delta_N$ with $N_0$ such that stability analysis considers the set of plants N.

$$N=\{N_0\Delta_N : \|\Delta_N\|_\infty \leq 1\} \tag{84}$$

Figure 18:
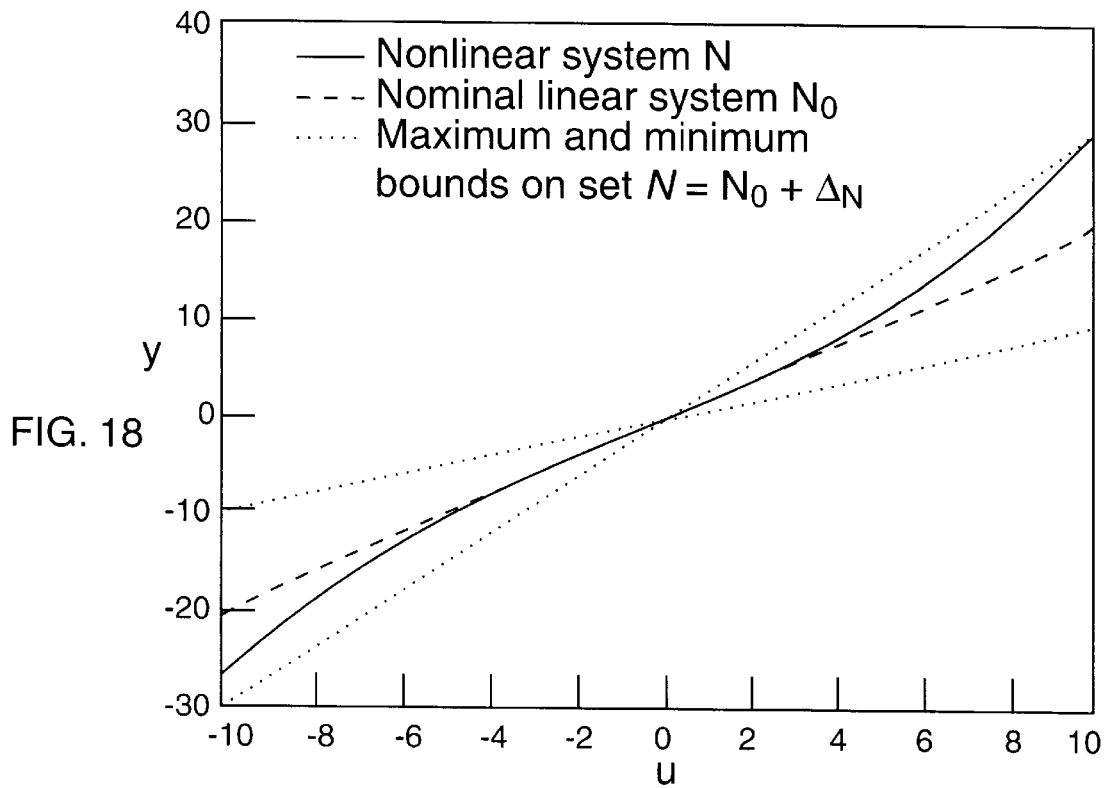
FIG. 18 illustrates system responses for hardening spring example.

FIG. 18 shows that the maximum and minimum magnitudes of the responses of the set N are able to bound the response of the nonlinear system N for the range u ∈ [10, 10]. These bounds are overly conservative throughout this operating range, but they achieve the desired goal of describing errors in the linear system response resulting from the unmodeled nonlinearity.

A similar procedure can be used to describe error caused by an unmodeled nonlinear softening spring. Consider the response y of a system represented by N that is valid for an input signal u ∈[−10, 10].

$$y=N=2u+0.005u^2-0.005u^3 \tag{85}$$

Define a linear nominal model $N_0$ such that $y=N_0$ u approximates the response of N.

$$N_0=2 \tag{86}$$

Associate an additive weighting operator $A_N$ with $N_0$ such that stability analysis considers the set of plants N.

$$N=N_0+\Delta_N : \|\Delta_N\|_\infty \leq 1 \tag{87}$$

Figure 19:
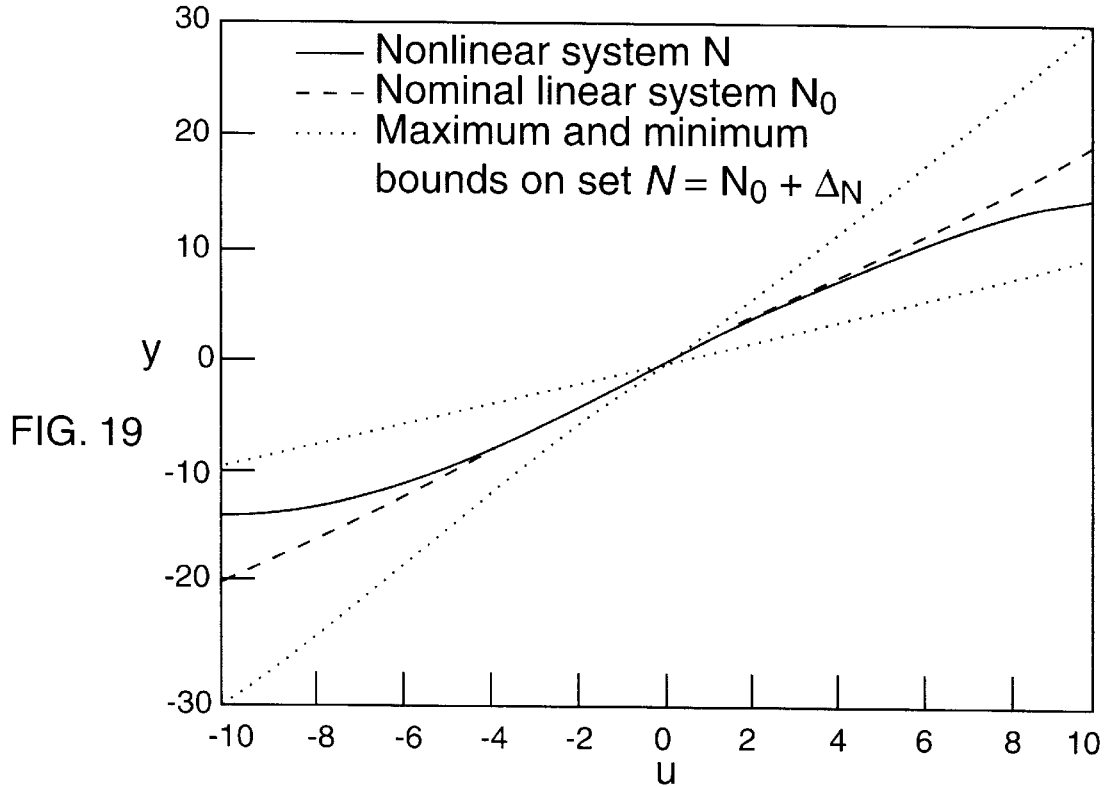
FIG. 19 illustrates system responses for softening spring example.

FIG. 19 shows that the maximum and minimum magnitudes of the responses of the set N are able to bound the response of the nonlinear system N for the range u ∈ [−10, 10]. These bounds are also overly conservative throughout this operating range, but they achieve the desired goal of describing errors in the linear system response resulting from the unmodeled nonlinearity.

Another nonlinearity that commonly affects aeroelastic systems is hysteresis. The response of a hysteretic system depends on the trend of the input signal such that an increasing input signal generates a certain response, but a decreasing input signal generates a different response. Such hysteresis dynamics are difficult to express as a simple mathematical formula, so for illustrative purposes, assume N is a nonlinear hysteresis function whose response y depends on the trend of the input signal. Define a linear nominal model $N_0$ whose response $y=N_0$ u approximates the response of the hysteretic N.

$$N_0=2 \tag{88}$$

Associate an additive weighting operator $\Delta_n$ with $N_0$ such that stability analysis considers the set of plants N.

$$N=N_0+\Delta_N : \|\Delta_N\|_\infty \leq 1 \tag{89}$$

Figure 20:
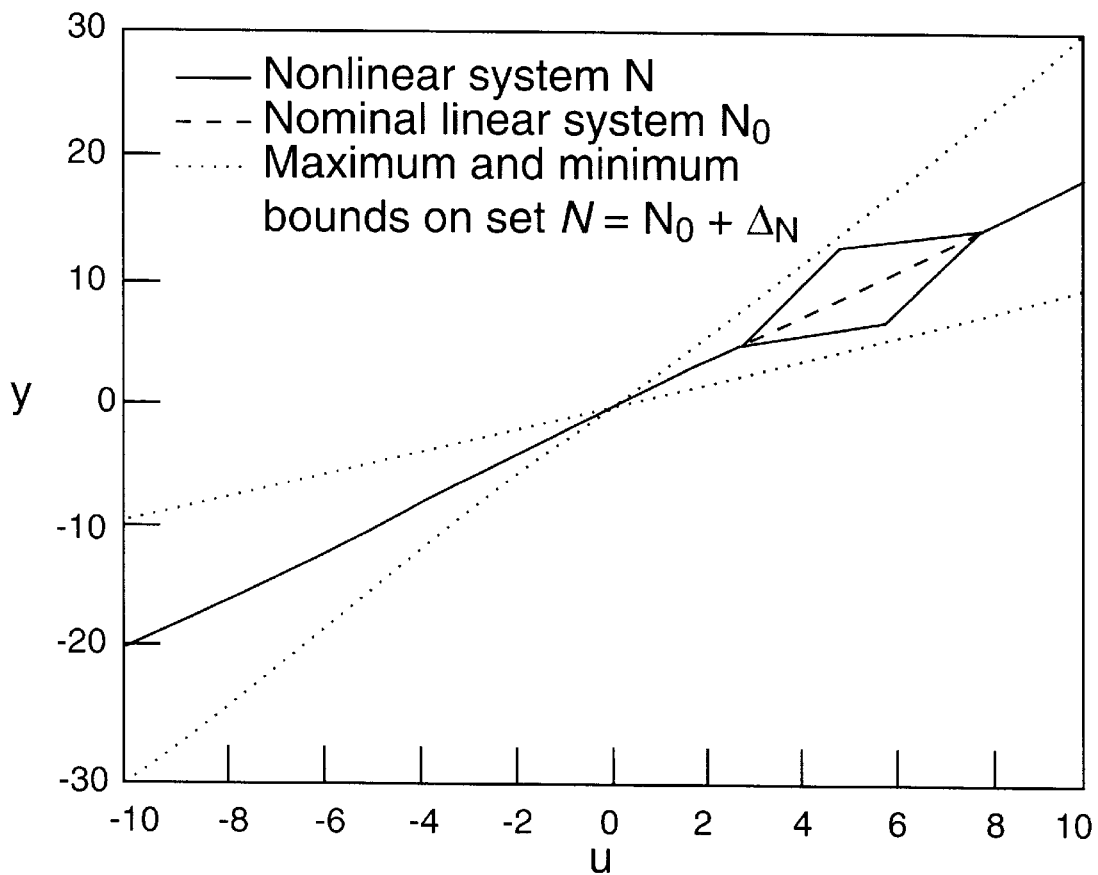
FIG. 20 illustrates system responses for hysteresis example.

FIG. 20 shows that the maximum and minimum magnitudes of the responses of the set N are able to bound the response of the nonlinear system N with the hysteresis for the range u ∈ [−10, 10]. Again, the bounds resulting from a linear uncertainty description are overly conservative throughout this operating range, but they achieve the desired goal of describing errors caused by the unmodeled hysteresis nonlinearity.

Explicitly constraining the operating region of the input signal u ∈ [−10, 10] can be important to developing reasonable uncertainties to describe errors resulting from unmodeled nonlinearities. The errors in the linear model can grow excessively large when considering a large range of inputs, so the uncertainty magnitude would need to also grow excessively large. The conservatism resulting from such a large uncertainty description may be unacceptable and require the input range to be constrained to more reasonable limits.

The uncertainty description, even for a constrained operating region, will usually be overly conservative when describing modeling errors for certain parts of the operating region. The uncertainty is able to bound the errors in FIGS. 19 and 20, but the maximum and minimum bound are clearly not optimal. Some amount of conservatism is expected when describing errors resulting from unmodeled nonlinearities because a linear model, whether a single plant or a set of plants, will usually not be an accurate representation of a nonlinear system that cannot be linearized.

Also, several types of unmodeled nonlinearities exist that are frequently encountered in aircraft systems but are not easily described by linear uncertainty operators associated with the linear models. Examples of these types of nonlinearities include free play, dead-band responses, friction, and rate limiting of actuators.

The robust stability margins computed from g with respect to the linear uncertainty operators describing unmodeled nonlinear dynamics will always be somewhat suspect, because this approach cannot consider stability properties unique to nonlinear systems such as bifurcation points and limit-cycle behaviors. This approach limits the usefulness of the μ method to systems for which the nonlinearities have small effects on the response and do not introduce nonlinear instabilities to the critical flutter mechanism.

Uncertainty Associated With Flight Data

A theoretical model with an associated uncertainty description can be an accurate representation of the aeroelastic dynamics of an aircraft, but responses from that model may not identically match flight data. Additional uncertainties can be associated with the model to describe errors that are observed between the predicted responses and the measured responses from a commanded excitation to the aircraft. These uncertainties do not necessarily indicate errors in the model; rather, these uncertainties indicate errors in the process used to generate aeroelastic responses and measure flight data.

One source of error is an incorrect assumption of excitation force used to generate the predicted and measured responses. The measured excitation force associated with the flight data may not correctly account for poor hardware performance and nonuniform spectral distribution of the force. Also, inexactly phased excitation between multiple force mechanisms can excite modes that are not anticipated by a theoretical analysis. A frequency-varying dynamic uncertainty can be associated with the force input of the analytical model to describe errors in the excitation.

The phenomenon of nonrepeatibility can cause discrepancies between predicted and measured responses from multiple occurrences of excitation signals. Nonrepeatibility affects flight data by introducing slight variations in responses, even for data recorded at identical flight conditions with identical excitation signals. This unexplained behavior may result from some unmodeled nonlinear dynamic or inexact excitation that is not correctly measured. External disturbances such as wind gusts or turbulence can introduce an unmodeled dynamic that inconsistently affects the aircraft responses. A frequency varying dynamic uncertainty can be associated with the model to describe nonrepeatible data variations.

Another source of error between predicted an measured responses is an incorrect assumption of flight condition. Flight data sets are sometimes generated at test points that attempt to maintain a constant flight condition to match the data sets predicted from a model describing the aeroelastic dynamics at that same flight condition. Slight variations in flight conditions while the experimental response is measured may cause some discrepancy between the predicted response and the flight data. Parametric uncertainty associated with the unsteady aerodynamic model can be used to account for these errors because flight condition variations only affect the aerodynamic model and not the structural model.

The model may accurately represent the mode shapes of the aircraft but have a poor representation of the sensor locations. The responses measured by sensors are inherently dependent on sensor location, with respect to mode shapes, to determine the magnitude and phase of the signal. Additional errors in magnitude and phase are introduced when considering transfer-function estimates generated by signals that violate assumptions used in computational algorithms. A frequency-varying dynamic uncertainty can be associated with the output of the plant model to describe errors in both mode shape and sensor location predictions.

The choice of signal-processing algorithms can also introduce errors between predicted an measured responses. The Fourier transform, which is the traditional tool for signal processing, assumes several characteristics of the data that may be violated with transient-response aeroelastic data. Filtering and wavelet-based algorithms may be used to reduce errors introduced by signal processing and reduce conservatism in the resulting stability margins. Parameter uncertainty associated with the modal parameters of the linear model may be used to describe some errors in the natural frequencies and dampings observed using flight data analyzed by incorrect algorithms. Dynamic uncertainty may also be required to describe errors introduced by leakage and aliasing effects.

MODEL VALIDATION OF UNCERTAINTY

Model Validation Using the Structured Singular Value

Robust stability analysis considers the stability of a system subject to a set of modeling errors and perturbations represented by a norm-bounded $\Delta$. A logical question that arises is how to reasonably determine this set. This issue is important for computing robust flutter margins because $\mu$ can be overly conservative if the uncertainty is excessive beyond the true modeling errors and can be overly optimistic if the uncertainty does not sufficiently account for the true modeling errors.

Model validation algorithms can be used to indicate if an uncertainty description is reasonable with respect to flight data. These algorithms consider whether or not a set of data measurements could have been generated by a proposed model that includes the nominal dynamics and associated uncertainty operators and noise and disturbance signals.

Uncertainty operators associated with the nominal plant model specifically in the LFT framework can be considered by validation algorithms. Frequency-domain algorithms are generated that consider the model validation problem in the context of control design. Time-domain approaches are also developed that can be solved with convex optimization algorithms for certain uncertainty structures.

Figure 21:
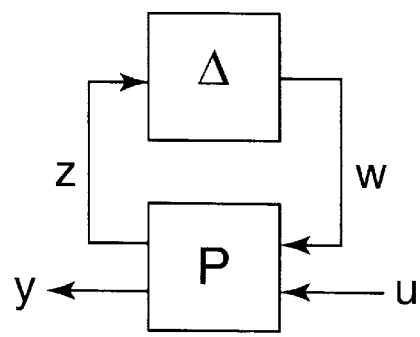
FIG. 21 illustrates a linear fractional transformation system for robust stability analysis and model validation with forcing and measurement signals.

A model validation procedure has been formulated that uses a $\mu$ condition to determine if an uncertainty model is invalidated. This procedure uses frequency-domain transfer-function data to determine if some perturbation $\Delta\epsilon\Delta$ the nominal plant could produce the measurements. Consider the block diagram for robust stability analysis of systems with measurement y and forcing u signals shown in FIG. 21. The model validation question, as applied to uncertainty models, is given in question 6.1.1.

Question 6.1.1 (uncertainty validation): Is there some frequency-varying $\Delta\epsilon\Delta$ for FIG. 21 such that $F_u(P,\Delta)$ could generate the set of observed data y and u?

Define $P(s) \in \mathcal{C}^{n_0+n_x \times n_i+n_v}$ as a stable transfer-function system matrix such that $P \in \mathfrak{R}, \mathcal{H}$. Partition this matrix into four elements such that $P_{11}(s) \in \mathcal{C}^{n_x \times n_w}$, $P_{22}(s) \in \mathcal{C}^{n_0 \times n_i}$, and $P_{21}(s)$ are of appropriate size. $P_{22}(s)$ is the nominal-plant transfer function in the absence of uncertainty.

$$P = \begin{bmatrix} P_{11} & P_{12} \\ P_{21} & P_{22} \end{bmatrix} \tag{90}$$

Robust stability analysis of this system is determined using the transfer function $P_{11}$ which contains the feedback relationship between the plant dynamics and the uncertainty operator. The robust stability condition given by theorem 3.3.3 requires $\mu(P_{11})<1$.

The model validation condition uses these elements of P and the finite-energy frequency-domain signals y, u $\in \mathcal{H}_2$ where the measurements are scalar functions y, u $\in$ C. Formulate the following two matrices.

$$\bar{P}_{12}=P_{12}u$$

$$\bar{P}_{22}=P_{22}u-y \tag{91}$$

The following theorem formulates the model validation test using $\mu$.

Theorem 6.1.2: Given measurements y generated by inputs $\mu$, then the system P with associated uncertainty set, $\Delta$ is not invalidated if $$\mu(P_{11}-\bar{P}_{12}\bar{P}_{22}{}^{-1}P_{21})>1 \tag{92}$$

This condition may seem counterintuitive in that the desired condition for validation is $\mu$ greater than one, while the robust stability condition seeks a value less than one. This condition can be explained by considering the following relationship of $y=F_u(P, \Delta)$ u as shown in FIG. 6. 1.

$$0=[P_{22}u-y]+P_{21}\Delta(I-P_{11}\Delta)^{-1}[P_{12}u]=\bar{P}_{22}+P_{21}\Delta(I-P_{11}\Delta)^{-1}\bar{P}_{12} \quad (93)$$

Define the plant $\bar{P}=\{\bar{P}_{11}, \bar{P}_{12}, P_{21}, \bar{P}_{22}\}$. A value of $\mu(\bar{P})<1$ implies this system is robustly stable to all perturbations $\Delta \in \boldsymbol{\Delta}$. This robust stability of $\mu(\bar{P})<1$ also implies that the loop gain $F_u(\bar{P}, \Delta)$ is not singular for any value $\Delta \in \boldsymbol{\Delta}$. Thus $\mu(\bar{P})<1$ would contradict the relationship shown in the above equations that requires $F_u(\bar{P}, \Delta)$ to be singular to satisfy the input-to-output relationship of the data. In this respect, the model validation test is actually an inverted robust stability test.

The phrase "model validation" may be misleading. No analytical model can ever be truly validated by considering a finite set of experimental data. A model may not be invalidated by the data, but no guarantee exists that a different data set could not be generated from the physical system that invalidates the model. The finite sets of measurement data cannot record the response of the system to an infinite number of input signals subject to an infinite number of initial conditions. Theorem 6.1.2 reflects this fact by explicitly stating the condition only determines if the model is invalidated by the data. The system is assumed to be nearly linear, and the data is assumed to sufficiently represent the behavior of the dynamics, so theorem 6.1.2 represents a model validation test.

Validating Norm Bounds for Uncertainty

The value of $\mu$ computed using theorem 6.1.2 can be interpreted as a measure of how reasonable the uncertainty description is. A value of $\mu=2$ implies the uncertainty can be scaled by 2 before the model is invalidated. Alternatively, a value of $\mu=0.5$ implies twice as much uncertainty is required for the model to not be invalidated. This interpretation of $\mu$, as relating to the size of allowable perturbations, emphasizes the relationship of the model validation condition to a robust stability condition.

This model validation is used in practice to generate reasonable norm bounds for an uncertainty description. The following algorithm can be used to determine a sufficient level of uncertainty required such that the model is not invalidated by multiple data sets. A small scalar $\alpha>1$ is chosen to scale the uncertainty set and increase the amount of allowable errors if the size of $\Delta$ is not sufficient.

Algorithm 6.2.1 (Model Validation):

Given frequency-domain data sets $\{y_1, y_2, \ldots, y_n\}$ and $\{u_1, u_2, \ldots, u_n\}$:

Given frequency-domain transfer-function P with elements $P_{11}, P_{12}, P_{21}, P_{22}$:

Given uncertainty set $\Delta$ with initial norm bound:

Given update scalar $\alpha>1$:

```
valid = FALSE
while(valid == FALSE){
    valid = TRUE
    for i = 1 : n{
        P̄₁₂ = P₁₂uᵢ
        P̄₂₂ = P₂₂uᵢ − yᵢ
        if μ(P₁₁ − P̄₁₂P̄₂₂⁻¹P₂₁) < 1{
            valid = FALSE
        }
    }
```

$P_{11} = \alpha P_{11}$ (equivalent to $\Delta = \alpha \Delta$)

}

$\Delta$ is the required norm-bounded uncertainty

The norm bound on the uncertainty set $\Delta$ is not actually increased with this method as denoted by the parentheses around the statement $\Delta=\alpha\Delta$. Scaling the uncertainty and retaining these scalings throughout the procedure would be difficult. The algorithm is simplified by always considering the uncertainty is scaled such that $\mu<1$ is always the desired result. This scaling of the uncertainty is actually accomplished by the statement $P_{11}=\alpha P_{11}$ which scales the feedback signals between the plant and uncertainty operators. The norm bound for the uncertainty that is needed to ensure the uncertainty levels are not invalidated by the data is scaled into the plant by the parameter $\alpha$. Robust flutter margins can be computed directly from the new scaled plant using algorithm 4.4.6 with a desired $\mu<1$ condition.

Algorithm 6.2.1 is a straightforward implementation of the model validation test. The $\mu$ values are only compared with 1 to determine if the model is invalidated. More sophisticated algorithms could use the value of $\mu$ to determine the factor $\alpha$ to scale the uncertainty. Also, the values of $\mu$ across frequency could be exploited. Frequencies with low $\mu$ value indicate areas where the uncertainty set is least conservative; frequencies with high $\mu$ are overly conservative. The scaling $\alpha$ could vary with frequency to reflect this information.

The situation may arise when the initial value chosen for the norm bound of the uncertainty set may be overly conservative. In this situation, the model validation condition will pass for each data set during the first processing of the outer loop. The initial norm bound can simply be decreased by some level consistent with the lowest $\mu$ value computed during the validation checks, and algorithm 6.2.1 can be run again to compute a less conservative uncertainty description that does not invalidate the model.

Theorem 6.1.2 is only valid for scalar data signals generated by systems with a single input and single output. Multiple data signals can be considered by applying theorem 6.1.2 to each combination of single input and −output signals. Algorithm 6.2.1 can still be used by simply including outer loops to cycle over the number of input and measurement signals.

The model validation algorithm using theorem 6.1.2 is a departure from traditional methods of analyzing flight data to assess accuracy of an analytical model. The most widely used algorithms for analyzing flight data estimate natural frequencies and modal damping. The model validation procedure using $\mu$ considers the response dynamics at each frequency without explicitly comparing modal properties. This procedure enhances the ability of the $\mu$ method to analyze flutter stability without requiring damping estimates.

Another interpretation of algorithm 6.2.1 uses the uncertainty $\Delta$ to bound the magnitude and phase of the possible transfer functions generated by the family of plants $F_u(P,\Delta)$. The structured singular value ensures the experimental data transfer function lies within these analytical bounds at every frequency.

PROCEDURE FOR THE $\mu$ METHOD

Model Updating

Generating a model by analyzing flight data is essential for computing a confident stability analysis. A nominal model generated purely from analytical equations of the predicted aircraft dynamics may not accurately describe the true aircraft. A model must be generated that accounts for the flight data to ensure the predicted dynamics represent the true dynamics.

The most direct method of generating a model from the flight data is to identify a system model entirely from the data measurements. Many system identification algorithms exist that have become standard tools for systems and control engineers. Direct application of these methods to aeroelastic systems rarely produces an accurate model that accounts for the dynamics of the aircraft. Aeroelastic response data is typically of poor quality relative to ground vibration test data because of the low signal-to-noise ratio and unobserved dynamics in the response measurements that may drastically lower the effectiveness of system identification algorithms.

An alternative method is to use the nominal aircraft dynamical model as an initial estimate to model the true aircraft. The flight data are then used to update the elements of this model. Several methods have been devised to update an analytical structural model using experimental data. Model updating can be performed on the full stress model or a subset computed with Guyan reduction. Generally, considering the full model is preferable because the reduction may distribute local errors throughout the entire model if an orthogonality condition is violated.

There are two basic methods for updating the full structural model using comparisons between experimental and predicted data. One method updates the mass and stiffness matrices of the finite element model. This method suffers from lack of physical interpretation of the matrix updates and possible numerical conditioning. Another method updates specific parameters in the model. This method is accurate for small systems but may require an excessive computational cost for large systems.

Aeroelastic models have the additional freedom of updating the aerodynamic and the structural elements. Another method of updating the linear model in a modern control framework has been developed. (K. D. Gondoly, *Application of Advanced Robustness Analysis to Experimental Flutter*, Masters of Science in Aeronautics and Astronautics Thesis, Massachusetts Institute of Technology, June 1995.) This method may be overly conservative for describing nonlinearities, and the corresponding stability margins are only accurate for flight conditions near the instability. A parametric identification algorithm has been developed that uses flight data to update specific terms in the aerodynamic model through a nonlinear optimization. This method suffers with flight data because of unobserved dynamics and the low signal-to-noise ratio in the measurements.

Figure 22:
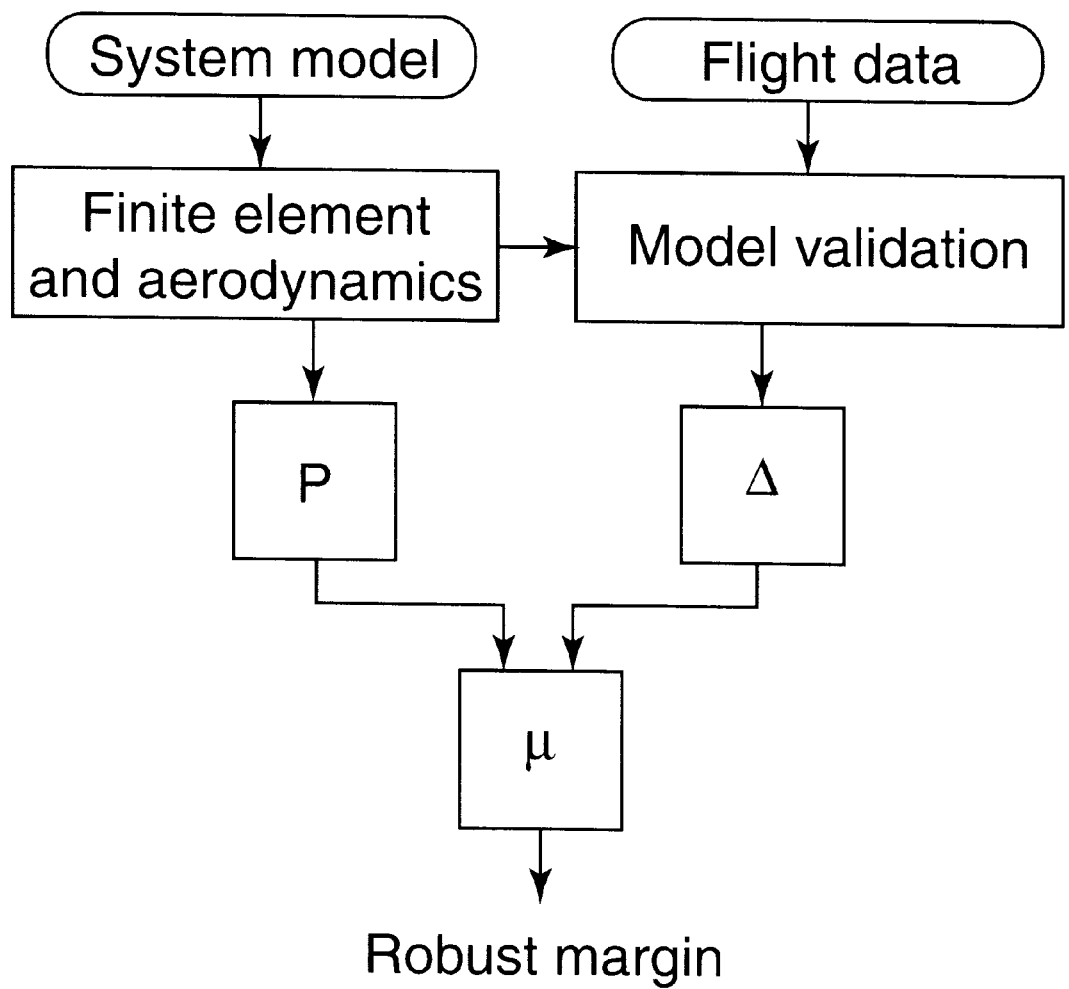
FIG. 22 information flowchart to generate plant and uncertainty operators from a system model and flight data with the $\mu$ method.
Figure 23:
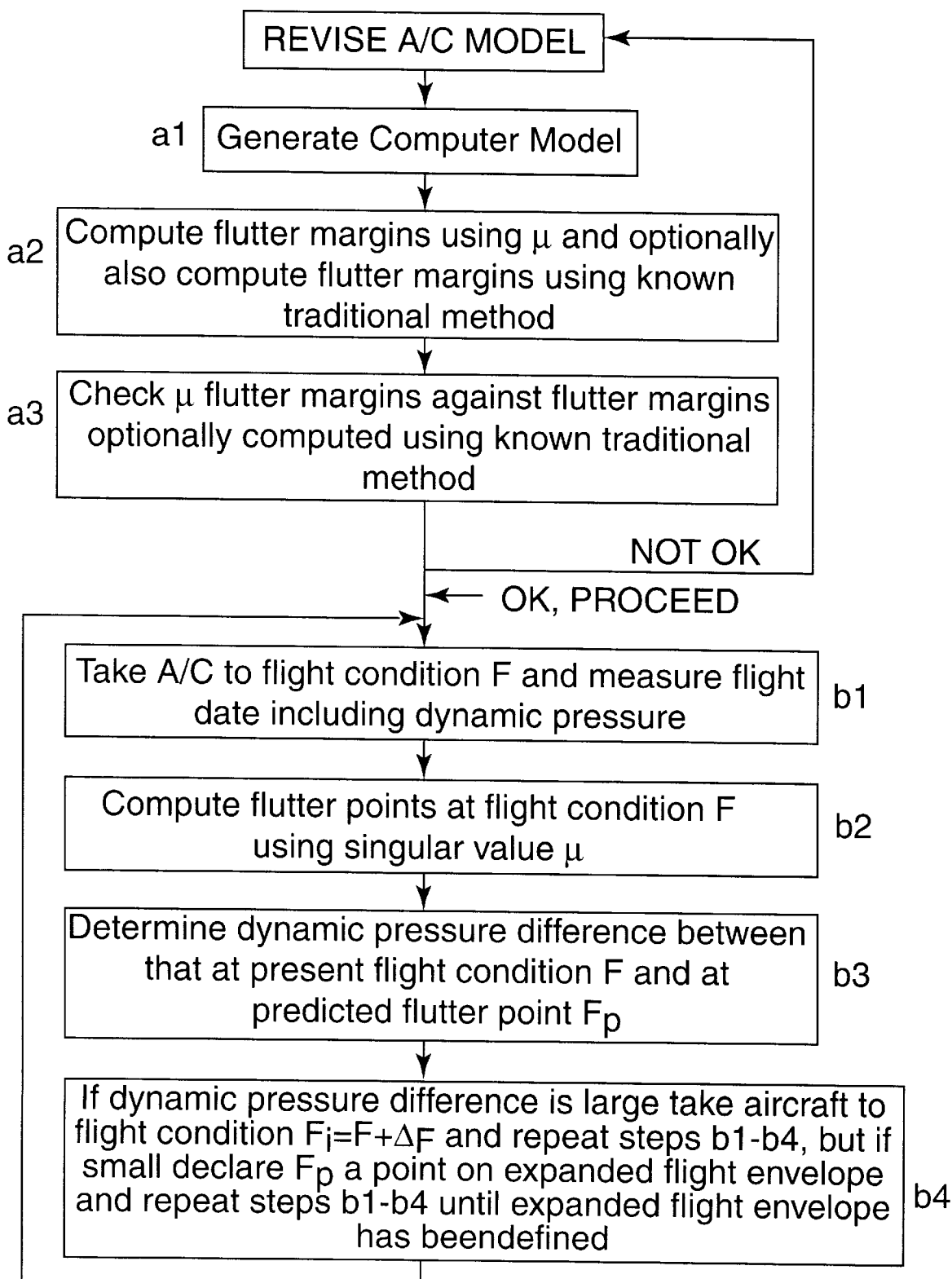
FIG. 23 is a flow chart for the over-all $\mu$ method for robust flutter prediction and safe flight envelope expansion of an aircraft model under test.

The approach taken in this invention is to update only the uncertainty operators of the robust aeroelastic model, using the flight data, and leave the nominal dynamics model unchanged. The model validation condition of theorem 6.1.2 is used with the nominal plant P to generate a reasonable uncertainty description $\Delta$ to associate with P. FIG. 22 shows the flow of information through the $\mu$ method.

Algorithm 6.2.1 presents a procedure to implement the $\mu$ method in a manner corresponding to FIG. 22. The model update procedure based on algorithm 6.2.1 actually scales the plant but has the equivalent effect of scaling the norm bound of the uncertainty description. The algorithm loops over the model validation procedure until an uncertainty description is determined that is not invalidated by the flight data. The final step is to compute a robust flutter margin from the scaled plant by using a $\mu<1$ condition as in algorithm 4.4.6.

Algorithm 7.1.1 (robust flutter margins with model updating):

Given nominal plant P:
Given uncertainty set $\Delta$ associated with P:
Given input excitation data u:
Given output response measurement data y:
Define $W \leqq I$ as the scaling update for $\Delta$ while $(F_u(P, \Delta)$ is invalidated by $u, y$ using algorithm 62.1){

$$\Delta = W\Delta$$

}

$\delta_{flutter}{}^{rob}$ is flutter margin computed from algorithm 4.4.6 flutter Several advantages exist to using this method as compared to traditional model updating methods. The typically poor quality of flight data, in association with aircraft dynamics consisting of many modes, makes updating a nominal model difficult. Traditional methods of norm-based update algorithms often generate a nonunique set of model updates that have no way to determine which update has the most logical physical interpretation. The method of updating the uncertainty operators based on a worst-case magnitude avoids this problem.

Also, this method can work with flight data of varying quality. The updated uncertainty description is highly accurate if the data show a high signal-to-noise ratio and much of the dynamics are observed by the sensors. If the data do not have these desired characteristics, however, the method can still compute a flutter margin. An uncertainty description may be difficult to compute if the data do not indicate the aircraft dynamics well, so the model validation procedure will not require a large magnitude for the uncertainty operators. The robust model in this situation will closely resemble the nominal model. In this way, the $\mu$ method will always generate a more accurate flutter margin, and at worst, the robust $\mu$ flutter margin will be equivalent to the nominal flutter margin.

Approaches to Use Flight Data

A flight test generally consists of maneuvers at several test points that may be at identical or different flight conditions. The entire flight test program will use many flight tests to measure response data at test points throughout the flight envelope. The model-updating method that generates uncertainty operators can use the entire set of flight data from the different test points.

Several approaches are formulated to use multiple flight data sets to update the uncertainty description associated with a nominal plant model. The uncertainty description may be different for each approach, and the resulting flutter margin will be different for each approach because of the dependence of $\mu$ on the uncertainty set. Two approaches discussed here are denoted as local and global.

A local approach uses flight data from test points at identical flight conditions. These data are used to generate an uncertainty description for the nominal model at the particular flight condition associated with the data. The magnitude of the uncertainty operators is chosen such that a robust model at the single flight condition is not invalidated by any of the flight data sets measured at the same flight condition with no consideration of data from other flight conditions.

The local approach shows the benefit of independently computing uncertainty descriptions for models at different flight conditions. This approach allows each uncertainty description to be more accurate because, for example, the flight data may indicate much smaller uncertainty operators are required for subsonic plant models even though large uncertainty operators are required for transonic plant models. The resulting worst-case flutter margins will be less conservative because less uncertainty is required for the model.

The following algorithm 7.2.1 outlines the local approach to use flight data and compute flutter margins.

Algorithm 7.2.1 (local approach):

Define scalar $n_f$ as the number of flight conditions.

Define scalar $n_i$ as the number of data sets at flight condition i.

Define vectors $\{u_i^1, u_i^2, \ldots, u_i^{n_i}\}$ as input excitations at flight condition i.

Define vectors $\{y_i^1, y_i^2, \ldots, y_i^{n_i}\}$ as response measurements at flight condition i.

Define matrices $\{P_1, P_2, \ldots, P_{n_f}\}$ as plant models at flight condition i.

```
for i = 1 : n_f {
    Choose initial Δ_i
    for j = 1 : n_i {
        Validate F_u (P_i, Δ_i) using y^j_i and u^j_i
        increase size of Δ_i if necessary to validate
    }
    compute flutter margin δ^i_flutter from u(F_u(P_i, Δ_i))
}
```

A global approach uses the entire set of flight data from test points throughout the flight envelope to generate a single uncertainty description for all nominal aircraft models. The magnitudes of the uncertainty operators are chosen such that all nominal models with the associated uncertainty description are not invalidated by any of the flight data sets.

Several advantages and disadvantages exist to using the global approach instead of the local approach. One disadvantage is a possible large increase in conservatism of the flutter margin because the uncertainty description is not minimized at each flight condition. A single particularly inaccurately plant model will require large uncertainty operators that may be highly conservative for plant models at flight conditions that are better representations of the true dynamics.

One advantage to this approach, however, is that the uncertainty description is truly worst-case with respect to the entire flight envelope. The worst-case errors from the worst-case fight condition are used to generate the uncertainty description for all conditions. Also, this approach is not very sensitive to poorly measured flight data. A poorly modeled modal response may only appear in certain data sets. The local approach would not include uncertainty for these dynamics at conditions that did not clearly observe this modal response, so the resulting flutter margin would not account for the true level of modeling errors. The flutter margin generated with the global approach may be more conservative than the local approach, but this approach introduces a corresponding higher margin of safety.

The following algorithm 7.2.2 outlines the global approach to use flight data and compute flutter margins.

Algorithm 7.2.2 (global approach):

Define scalar $n_f$ as the number of flight conditions.

Define scalar $n_i$ as the number of data sets at flight condition i.

Define vectors $\{u_i^1, u_i^2, \ldots, u_i^{n_i}\}$ as input excitations at flight condition i.

Define vectors $\{y_i^1, y_i^2, \ldots, y_i^{n_i}\}$ as response measurements at flight condition i.

Define matrices $\{P_1, P_2, \ldots, P_{n_f}\}$ as plant models at flight condition i.

Choose initial $\Delta_i$

```
for j = 1 : n_f {
    for i = 1 : n_i {
        Validate F_u (P_i, Δ) using y^j_i and u^j_i
        increase size of Δ if necessary to validate
    }
}
for i=1 : n_f {
    compute flutter margin δ^i_flutter from u(F_u(P_i, Δ))
}
```

Hybrid approaches have also been formulated that mix the local and global approaches. One straightforward hybrid approach is to generate an uncertainty description using all data from a small range of flight conditions. This approach can be useful for separately considering sets of plant models that are generated using different techniques. For example, the model-generating package used for this paper computes all subsonic plant models with a doublet-lattice algorithm and the supersonic models are generated with constant-panel algorithms. A hybrid approach could be used to reflect this knowledge and consider groups of subsonic, supersonic, and transonic plants independently.

The approaches outlined here are certainly not exhaustive. A weighted-norm approach can be formulated that uses flight data from the entire envelope but depends heavily on a particular subset of that data. Other approaches could concentrate on particular dynamics through modal filtering techniques to generate separate uncertainty descriptions for individual modes.

Although particular embodiments of the invention have been described and illustrated herein, it is recognized that modifications may readily occur to those skilled in the art. For example, although matrix algebra has been used throughout to describe the invention in order to facilitate its implementation by computer programming since the matrices define for the programmer how the elements are to be processed, the invention is not limited to the implementation disclosed in this manner. Any other form of mathematical expression and its implementation by computer programming will be equivalent. Consequently, it is intended that the claims be interpreted to cover such modifications and equivalents thereof.

What is claimed is:

1. An on-line method for robust flutter prediction in expanding a safe flight envelope for an aircraft to define an envelope of safe flight conditions, comprising two parts, a first part comprising the steps of (a1) generating a computer model of said aircraft, (a2) computing flutter margins of said aircraft from said computer model using a singular value $\mu$ to define a first safe flight envelope and optionally using a well known traditional method for defining a second safe flight envelope used in double checking the safety of said first safe flight envelope defined by its computed flutter margins, (a3) if computed flutter margins thus double checked are found to define an envelope of safe flight conditions, or an optional method of defining a safe flight envelope is not used, proceed to a second of said two parts, said second part comprising in-flight steps of, (b1) taking said aircraft to a safest point within said first safe flight envelope at a flight condition, F, and measuring flight data at said present condition F, including dynamic pressure defined by parameters comprising altitude and air speed;

(b2) compute a predicted flutter point, $F_p$, at a higher dynamic pressure than at said condition F using an algorithm based on said flight data and said singular value $\mu$;

(b3) determine dynamic pressure difference between dynamic pressure of said aircraft at said present flight condition F and at said predicted flutter point $F_p$;

(b4) if said dynamic pressure difference is large, take said aircraft from present flight test condition to a new flight test condition $F_i = F + \Delta_F$, where $\Delta_F$ are the changes to parameters of flight condition F comprising altitude to take said aircraft to a new flight condition $F_p$ from flight condition F, to incrementally expand testing said first safe flight envelope and repeat steps b1, b2, b3 and b4; but if said dynamic pressure difference is small, declare the last predicted flutter margin $F_p$ as a point on said aircraft's expanded safe flight envelope, and repeat steps b1–b4 until sufficient flight conditions within said first safe flight envelope have been tested to expand margins thereof;

whereby a robust expanded flight envelope is determined for said aircraft using said singular value $\mu$ and said in-flight steps.

* * * * *